(12) United States Patent
Noguchi et al.

(10) Patent No.: US 7,540,019 B2
(45) Date of Patent: May 26, 2009

(54) PROCESSING DEVICE CAPABLE OF IMPLEMENTING FLEXIBLE ACCESS CONTROL

(75) Inventors: Takashi Noguchi, Yokohama (JP);
Takayuki Noda, Hitachinaka (JP);
Hiromitsu Kato, Machida (JP);
Katsumi Kawano, Kawasaki (JP)

(73) Assignee: Hitachi High-Technologies Corporation, Tokyo (JP)

( * ) Notice: Subject to any disclaimer, the term of this patent is extended or adjusted under 35 U.S.C. 154(b) by 852 days.

(21) Appl. No.: 10/998,751

(22) Filed: Nov. 30, 2004

(65) Prior Publication Data

US 2005/0154919 A1    Jul. 14, 2005

(30) Foreign Application Priority Data

Jan. 8, 2004    (JP)    ............................. 2004-002576

(51) Int. Cl.
*H04L 9/00*    (2006.01)
(52) U.S. Cl. .......................................................... 726/4
(58) Field of Classification Search ...................... 726/4
See application file for complete search history.

(56) References Cited

U.S. PATENT DOCUMENTS

2002/0059030 A1 * 5/2002 Otworth et al. ............... 702/19

FOREIGN PATENT DOCUMENTS

JP    08-185349    7/1996

* cited by examiner

*Primary Examiner*—Kambiz Zand
*Assistant Examiner*—Aubrey H Wyszynski
(74) *Attorney, Agent, or Firm*—Antonelli, Terry, Stout & Kraus, LLP.

(57) ABSTRACT

A processing device has a personal authentication information receiving unit for receiving personal authentication information, a security information DB, and a processing information managing unit. The processing information managing unit converts the personal authentication information received by the personal authentication receiving unit to a user ID, detects an event concerning a processing operation, and associates the event with the user ID, thereby creating or updating an access management table for processing performance information, for storage in the security information DB. The processing information management unit then controls access to the processing performance information based on the access management table and the user ID obtained by conversion of the personal authentication information received by the personal authentication information receiving unit.

12 Claims, 22 Drawing Sheets

FIG. 4

| TAG ID | USER ID | ANALYSIS START PERMISSION FLAG |
|---|---|---|
| 2345 | AAA | 1 |
| 2347 | BBB | 1 |
| 2359 | CCC | 0 |
| 3567 | DDD | 0 |
| 5678 | EEEE | 1 |
| ⋮ | ⋮ | ⋮ |

FIG. 5

| TAG ID | SAMPLE ID |
|---|---|
| 2345 | 56 |
| 2345 | 57 |
| 2345 | 58 |
| 5678 | 59 |
| 5678 | 60 |
| ⋮ | ⋮ |

FIG. 6

| SAMPLE ID 602 | REACTION PROCESS 603 | ANALYSIS METHOD ID 604 | REAGENT ID 605 | GENDER 606 | COMMENT 607 | EVALUATION RESULT 608 |
|---|---|---|---|---|---|---|
| 56 | REACTION PROCESS 1 | 2 | 56 | 0 | | EVALUATION RESULT 1 |
| 57 | REACTION PROCESS 2 | 2 | 56 | 1 | | EVALUATION RESULT 2 |
| 58 | REACTION PROCESS 3 | 3 | 60 | 1 | | EVALUATION RESULT 3 |
| 59 | REACTION PROCESS 4 | 3 | 60 | 1 | ALLERGY | EVALUATION RESULT 4 |
| 60 | REACTION PROCESS 5 | 3 | 60 | 0 | | EVALUATION RESULT 5 |
| -------- | -------- | -------- | -------- | -------- | -------- | |

601

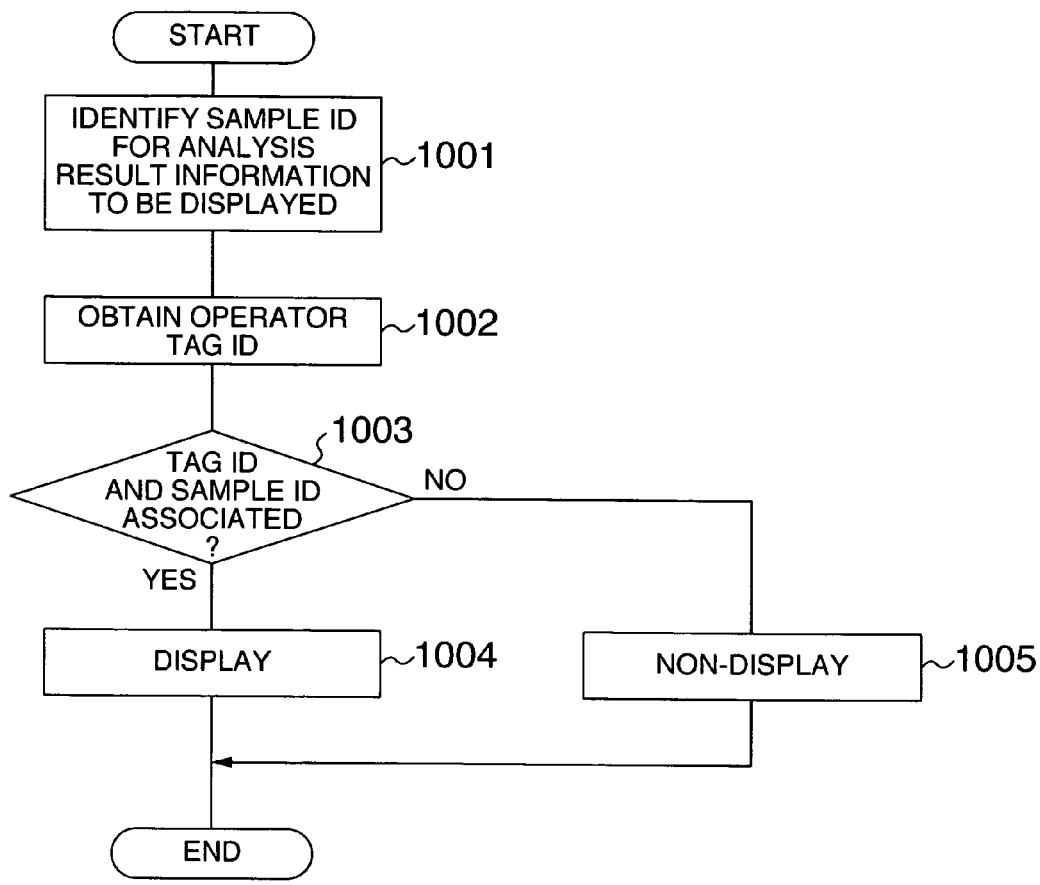

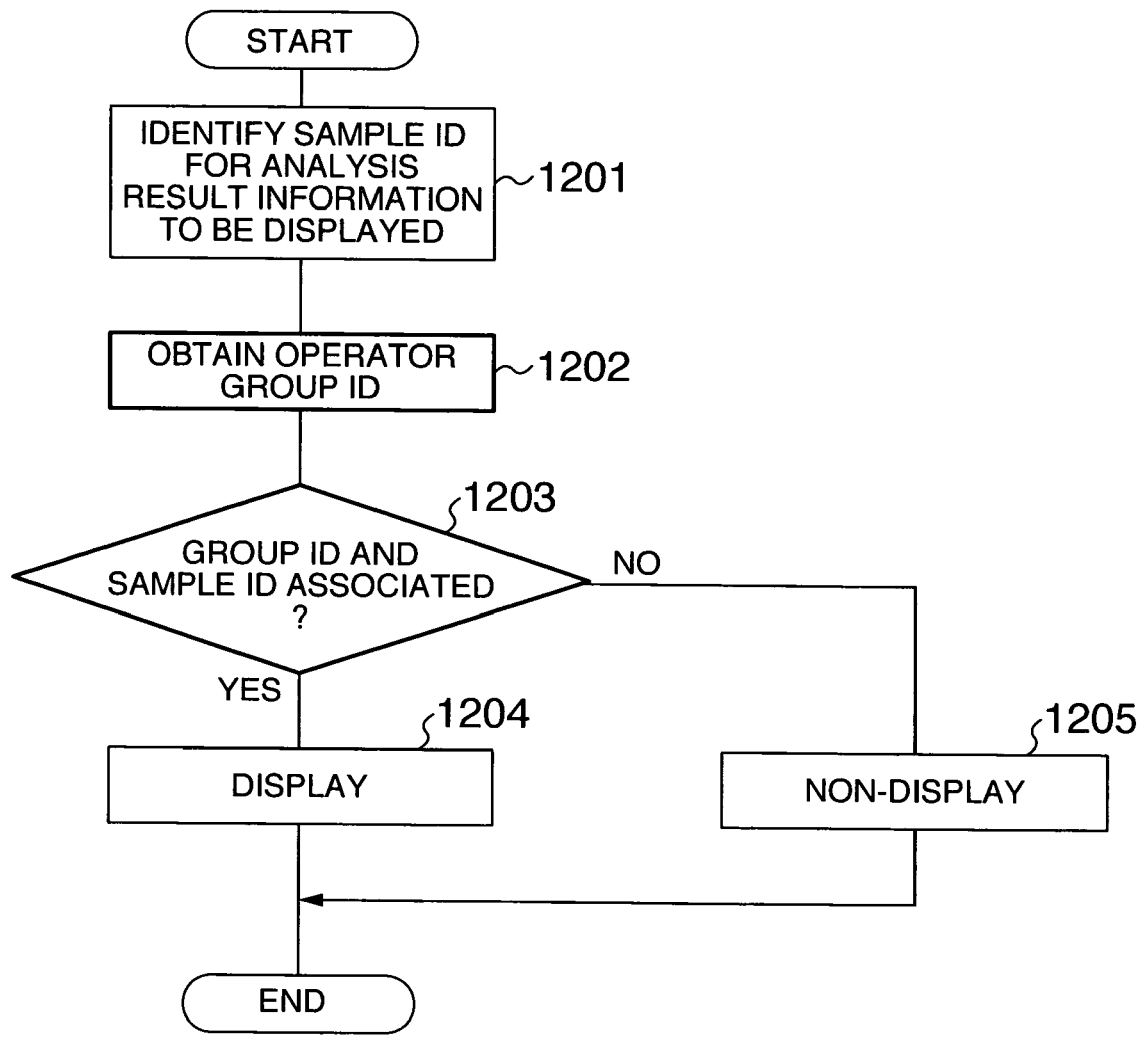

FIG. 14A
OPERATOR TAG ID STORAGE BUFFER 1501

| 1501 |
|------|
| 2345 |

FIG. 14B
BROWSER TAG ID MANAGEMENT BUFFER 1500(B)

| 1502 | 1503 |
|------|------|
| 2 | 2347 / 2359 |

FIG. 14C
UNREGISTERED PERSON TAG ID MANAGEMENT BUFFER 1500(C)

| 1504 | 1505 |
|------|------|
| 1 | 6789 |

FIG. 13A
COMMUNITY MANAGEMENT BUFFER 1400(A)

| 1401 | 1402 |
|------|------|
| 4 | 2345 / 2347 / 2359 / 6789 |

FIG. 13B
DETECTED TAG ID MANAGEMENT BUFFER 1400(B)

| 1403 | 1404 |
|------|------|
| 2 | 2345 / 2359 |

DISPLAY DATA COUNT MANAGEMENT
REGION 1701

DISPLAY DATA STORAGE REGION 1700

| NUMBER OF CHARACTERS | INTEGER | LOCATION | SIZE | COLOR | ASSOCIATED SAMPLE ID |
|---|---|---|---|---|---|
| 2 | 59 | 600 100 | 10 | WHITE | 59 |
| 1 | 3 | 600 120 | 10 | WHITE | 59 |
| 2 | 60 | 600 140 | 10 | WHITE | 59 |
| 5 | ALLERGY | 600 160 | 10 | WHITE | 59 |
| 3 | RECHECK REQUIRED | 600 180 | 10 | RED | 59 |

FIG. 20

| AUTHENTICATION INFORMATION 2202 | TAG ID 2203 | USER ID 2204 | ANALYSIS START PERMISSION 2205 | GROUP ID 2206 | NETWORK ADDRESS 2207 | TAG MANAGEMENT FLAG 2208 |
|---|---|---|---|---|---|---|
| '123@sdfewerwqer | 2345 | AAA | ○ | A | ::: ::: ::: | 1 |
| @poasdfwwd@asdf | 2347 | BBB | ○ | A | ::: ::: ::: | 1 |
| asdfasd*asdfweqrqw | 2359 | CCC |  | B | ::: ::: ::: | 0 |
| asdfawedqwefdasdfa | 3567 | DDD | ○ | B | ::: ::: ::: | 0 |
| ddfasd@sdfgsgfdsdf | 5678 | EEEE |  |  | ------- | 0 |
| ------- |  |  |  |  |  |  |

2201

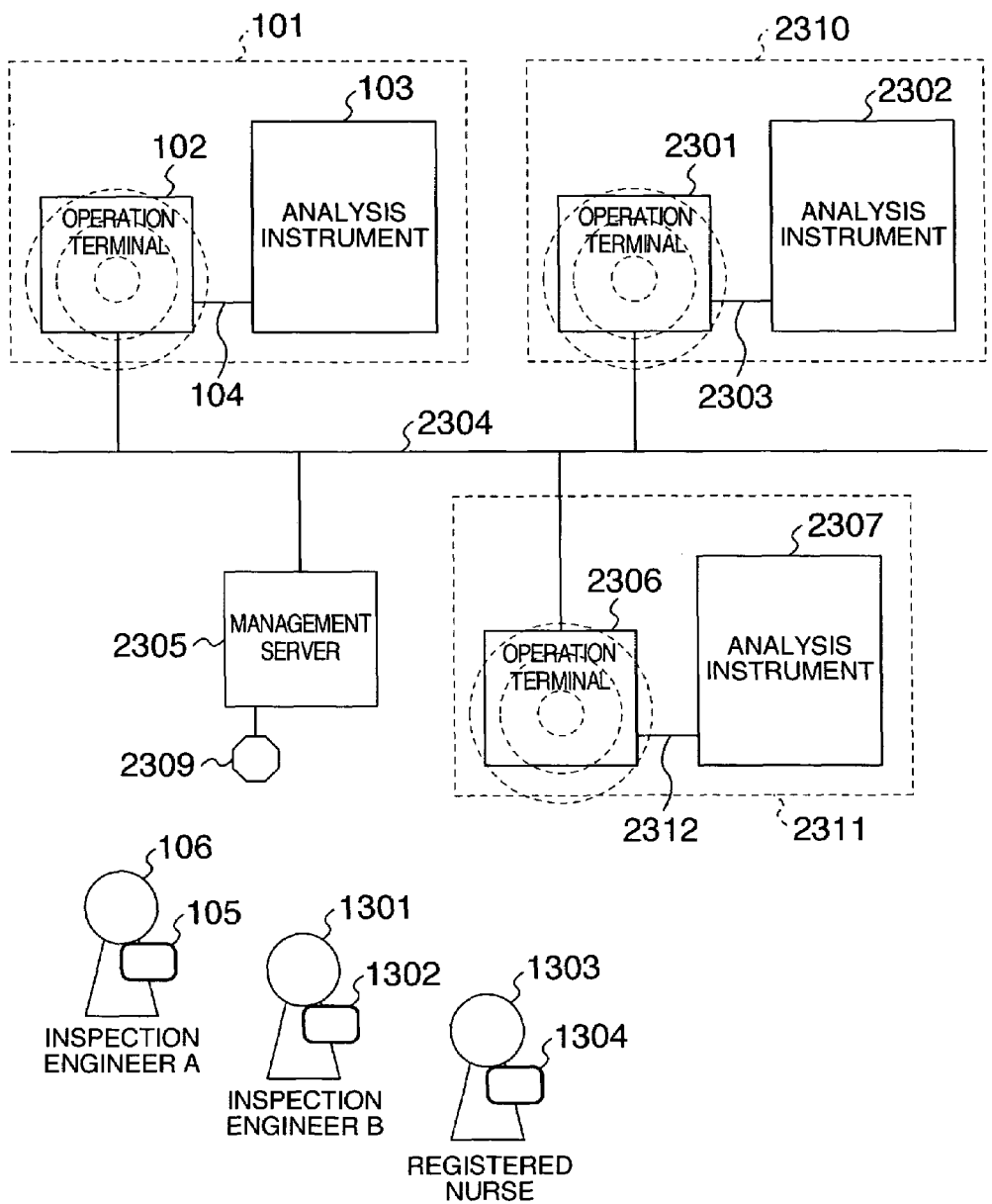

REGISTERED TAG COUNT MANAGEMENT REGION

2401

REGISTERED TAG ASSOCIATED INFORMATION STORAGE REGION

| TAG ID | USER ID | ANALYSIS START PERMISSION | GROUP |
|---|---|---|---|
| 2345 | AAA | ○ | A |
| 2347 | BBB | ○ | A |

2402  2403  2404  2405  2406

REQUEST MESSAGE FORMAT

RESPONSE MESSAGE FORMAT

PROCESSING DEVICE CAPABLE OF IMPLEMENTING FLEXIBLE ACCESS CONTROL

INCORPORATION BY REFERENCE

The present application claims priority from Japanese application JP2004-002576 filed on Jan. 8, 2004, the content of which is hereby incorporated by reference into this application.

BACKGROUND OF THE INVENTION

The present invention relates to a field of security for controlling access authorization/unauthorization over information managed by an information processing device.

As a conventional technology in regard to access control over the information managed by the information processing device, a technology concerning a medical analysis device described in JP-A-8-185349, for example, can be pointed out. According to the conventional technology described above, the security level of each user and the security level of each analytical performance information are defined in advance. Then, when the user has completed logging in of the analysis device and has requested access to specific analytical performance information, whether the access is authorized or not is determined based on the security level assigned to the user and the security level assigned to the analytical performance information. Access authorization/unauthorization for the analytical performance information thereby becomes possible.

In the conventional technology described above, in an inspection room in which an inspection engineer processes a sample carried to the inspection room, access authority assignment for each analytical performance information has to be performed for each person in charge. Thus, there was a limit as to speeding up and accuracy of these assignment operations. Further, when a plurality of inspection engineers evaluates the result of analysis by referring to the management screen of one analysis device, there was also a limit as to flexible access control considering a combination of inspection engineers who participate in the evaluation.

SUMMARY OF THE INVENTION

An object of the present invention is therefore to provide a technology for implementing flexible access control over information, based on conditions surrounding an information processing device.

The present invention provides a technology for implementing flexible access control over analytical performance information in particular, based on conditions surrounding an analysis device.

An information processing device according to the present invention includes:

a personal authentication information receiving unit for receiving personal authentication information;

a security information DB; and a processing information managing unit for converting the personal authentication information received by the personal authentication information receiving unit to a user ID, detecting an event concerning an information processing operation, associating the event with the user ID, thereby creating an access management table for processing information, for storage in the security information DB, and controlling access to the processing information based on the access management table and the user ID obtained by conversion of the personal authorization information received by the personal authentication information receiving unit.

When the present invention is applied to a medical analysis device, the information processing operation corresponds to an analysis operation, and information corresponds to analytical performance information. With the arrangement described above, when a plurality of inspection engineers evaluate the result of analysis while referring to the management screen of one analysis device, flexible access control considering a combination of the inspection engineers who participate in the evaluation becomes possible. More specifically, even a person in charge who cannot usually refer to the analytical performance information renders the analytical performance information anonymous to such a degree that does not invade the privacy of a patient and displays the anonymized information, if a person in charge having a specific authority is around him.

As examples of the analysis device, devices such as a biochemical analysis device, a hematological analysis device, and a DNA analysis device that handle information on physical traits and health conditions of an individual can be pointed out. As examples of the analytical performance information, a reaction process, the result of analysis, a comment by an inspection engineer, and the result of evaluation by the inspection engineer can be pointed out.

According to the present invention, flexible access control over information based on conditions surrounding an information processing device becomes possible, and security can be provided at a high level without increasing the amount of operation.

Other objects, features and advantages of the invention will become apparent from the following description of the embodiments of the invention taken in conjunction with the accompanying drawings.

BRIEF DESCRIPTION OF THE DRAWINGS

FIG. 4 shows a tag registration table 401 stored in a security information DB 203 in the first embodiment;

FIG. 5 shows a tag ID/sample ID association table stored in the security information DB 203 in the first embodiment;

FIG. 6 shows an analytical performance information storage table stored in an analysis-related information DB in the first embodiment;

FIG. 9 shows a processing flow when the operation terminal 102 displays analytical performance information based on an access management table 501 created at step 903, in the first embodiment;

FIG. 10 shows a tag registration table 1101 in an example of a variation of the first embodiment, obtained by adding a group ID 1102 to the tag registration table 401 in the first embodiment;

FIG. 11 shows a processing flow when the operation terminal 102 displays analytical performance information based on the access management table created at step 903, in the variation example of the first embodiment;

FIG. 13A shows a community management buffer in the second embodiment;

FIG. 13B shows a detected tag ID management buffer in the second embodiment;

FIG. 14A shows an operator tag ID management buffer in the second embodiment;

FIG. 14B shows a browser tag ID management buffer;

FIG. 14C shows an unregistered person tag ID management buffer;

FIG. 20 shows a tag management table 2201 stored in a security information DB 2102 of the management server 2305, in the third embodiment;

FIG. 21 shows a utilized image of the analysis device 101, an analysis device 2310, and an analysis device 2311, in the third embodiment;

DESCRIPTION OF THE EMBODIMENTS

A first embodiment of the present invention will be described with reference to FIGS. 1 to 9.

Figure 1:
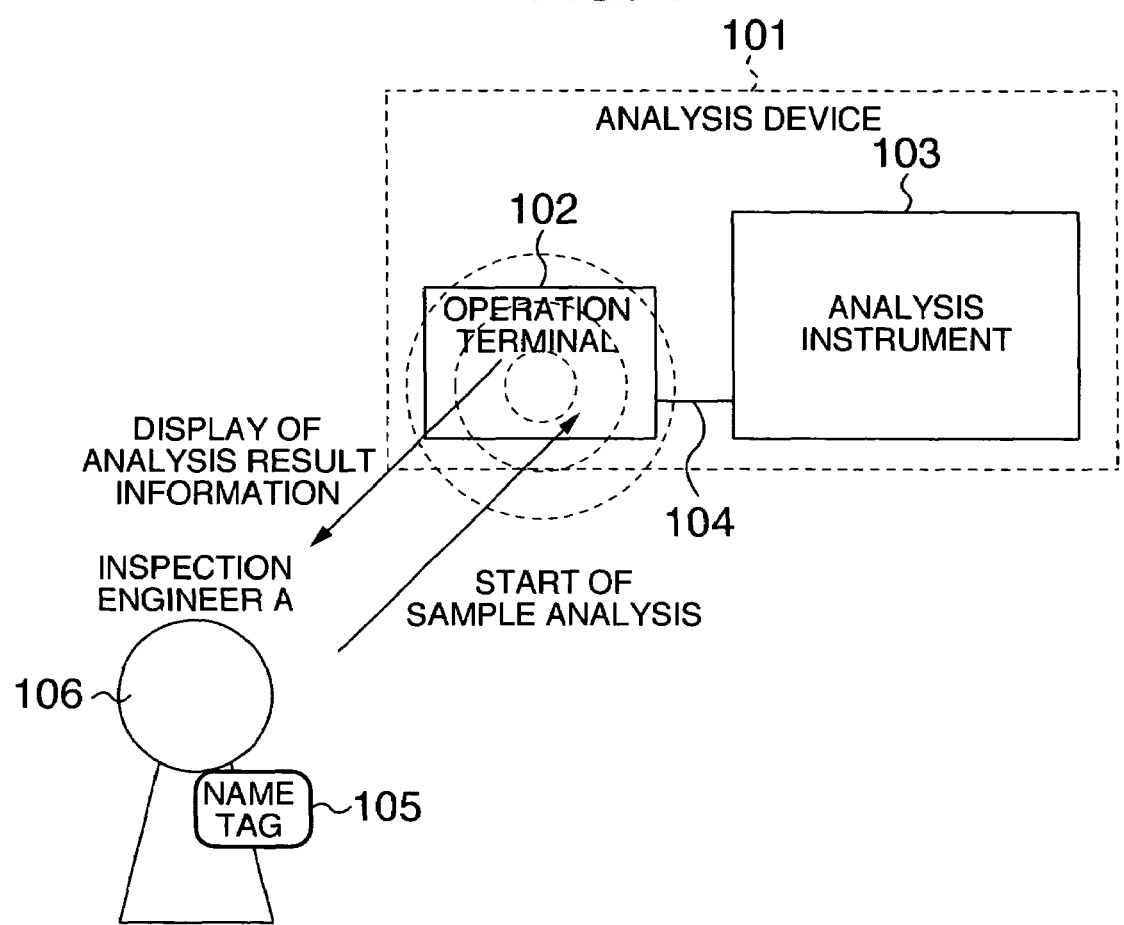
FIG. 1 shows a utilized image of an analysis device 101 in a first embodiment of the present invention.

FIG. 1 is a diagram showing a utilized image of an analysis device 101. An inspection engineer A106 wears a name tag 105. In the name tag 105, a noncontact type tag with a unique ID for specifying an individual assigned thereto is embedded. The analysis device 101 is constituted by connecting an operation terminal 102 provided with a reader for identifying the ID for the tag and an analysis instrument (unit) 103 for receiving a sample for analysis via a network 104 such as a LAN.

In the first embodiment, the inspection engineer A106 wearing the name tag 105 uses the operation terminal 102 to make a request for starting analysis by the analysis instrument (unit) 103 and perform evaluation of the result of the analysis by referring to analysis result information. The analysis device 101 performs access control over the analysis result information based on the sample set in the analysis instrument 103 and the tag of the name tag 105 detected by the operation terminal 102. While the sample having the unique assigned ID is received in the first embodiment, a receptacle for storing a plurality of samples (hereinafter referred to as a rack) each having a unique assigned ID may be received.

Figure 2:
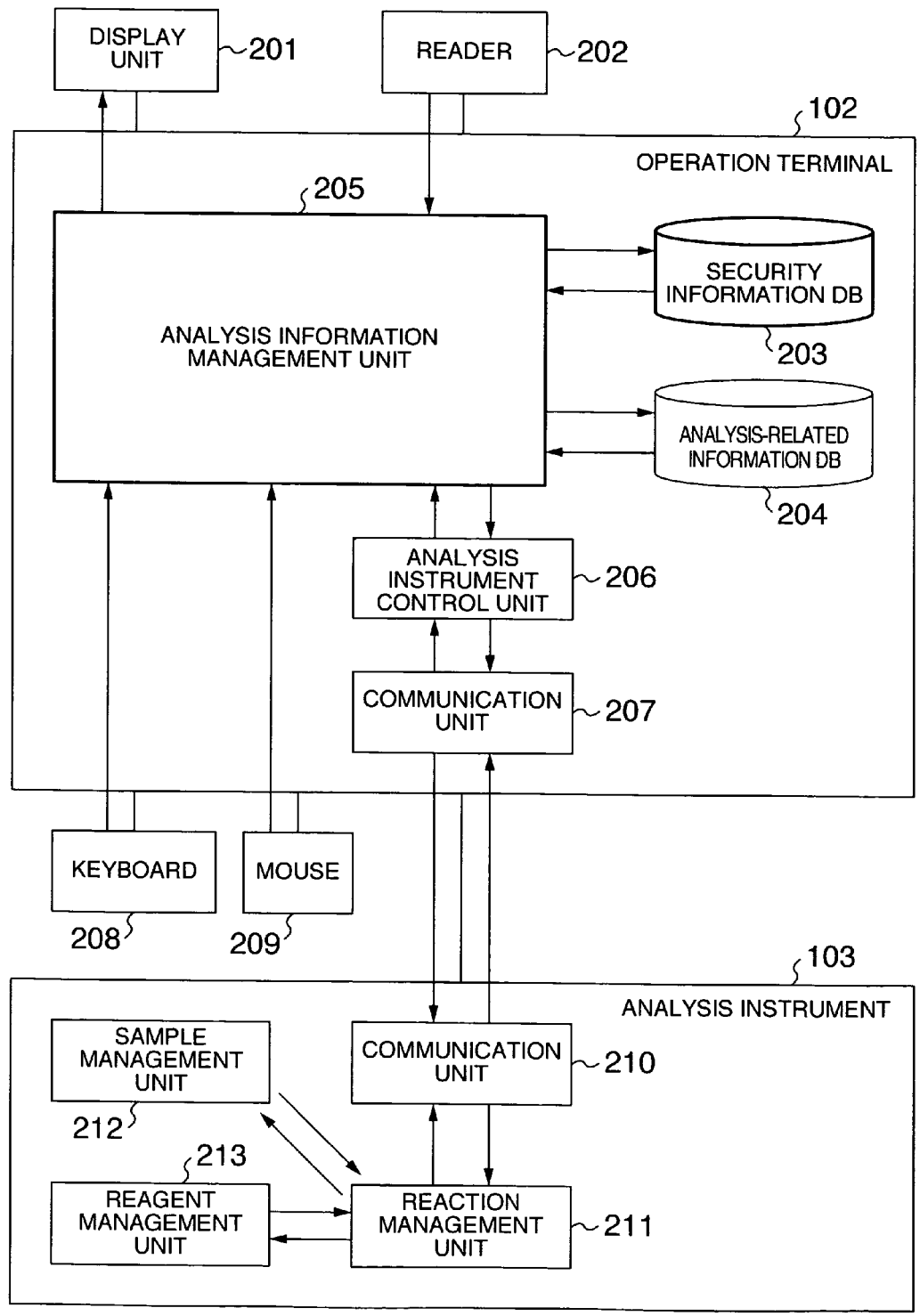
FIG. 2 is a system block diagram of the analysis device 101 in the first embodiment.

FIG. 2 is a system block diagram showing the analysis device 101 in the first embodiment. The operation terminal 102 is constituted by an analysis information management unit 205 for performing information processing in the analysis device, an analysis instrument control unit 206 for controlling the analysis instrument 103, a communication unit 207, a keyboard 208, a mouse 209, a display unit 201, a reader 202 for uniquely detecting a tag, a security information DB 203 for storing information on settings for security and the like, and an analysis-related information DB 204 for managing analytical setting information, analysis result information, and information on personal settings associated with tag IDs. In the first embodiment, the reader 202 detects only one tag simultaneously. As such a reader, the reader that has adopted the SDMA (space division multiple access) method, for example, is put to practical use.

The analysis instrument 103 is constituted by a communication unit 210, a reaction management unit 211 provided with reaction vessels, a sample management unit 212 for receiving samples for management, and a reagent management unit 213 for receiving reagents for management.

In the first embodiment, the reaction management unit 211 receives a control command from an analysis instrument control unit 206 through the communication unit 210 and a communication unit 207 and controls the sample management unit 212 and the reagent management unit 213 based on the received control command, thereby injecting a predetermined amount of a sample and a reagent into one of the reaction vessels at a predetermined timing. Further, the reaction management unit 211 traces a reaction process represented by absorbance, for transmission to the analysis instrument control unit 206. The analysis information management unit 205 receives the reaction process from the analysis instrument control unit 206, for storage in the analysis-related information DB 204.

Figure 3:
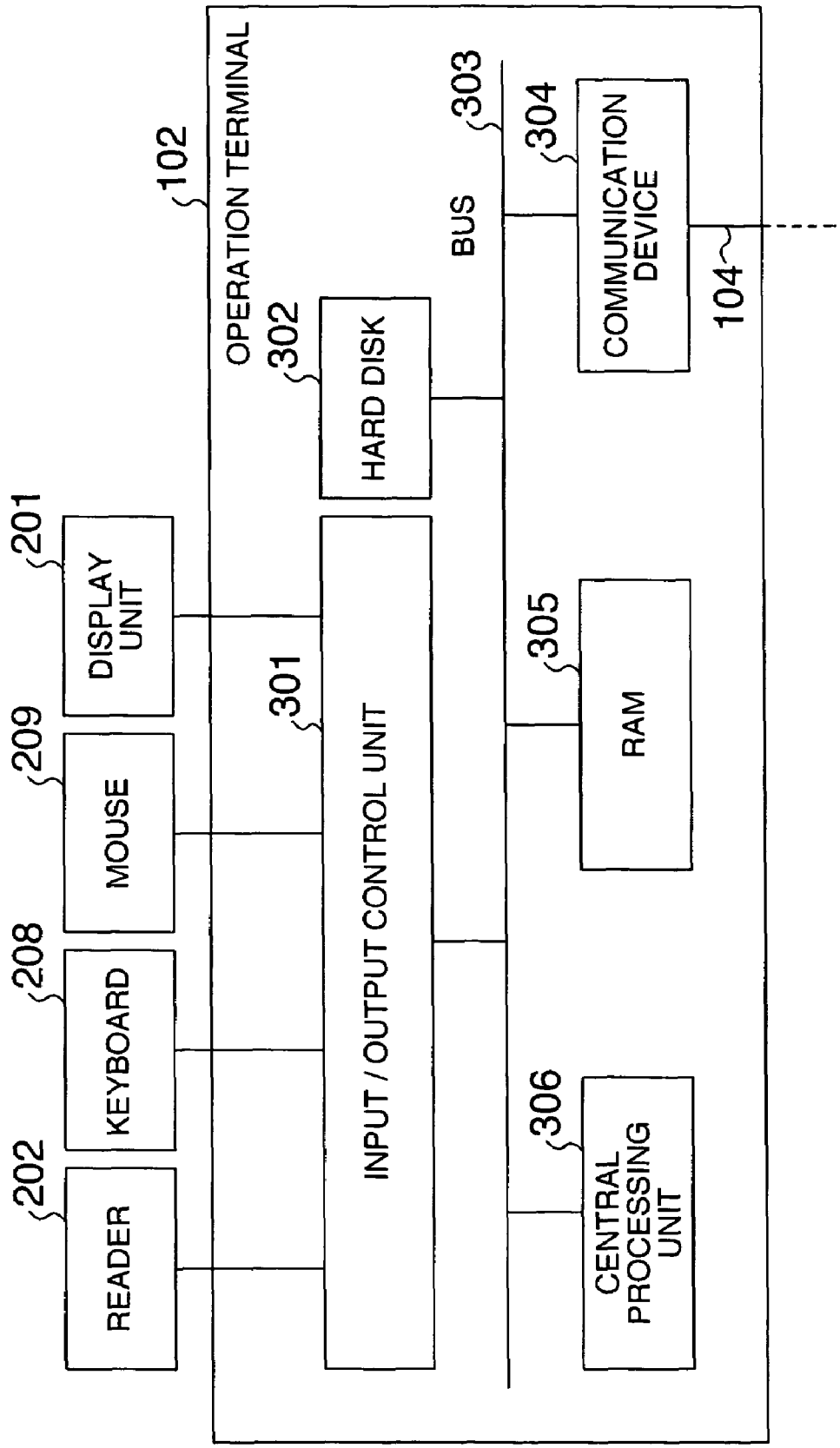
FIG. 3 is a diagram showing a hardware configuration of an operation terminal 102 in the first embodiment.

FIG. 3 shows a configuration of the hardware of the operation terminal 102 in the first embodiment. The operation terminal 102 can be implemented using a general computer having a configuration in which an input and output control unit 301 for controlling the reader 202, keyboard 208, mouse 209, and display unit 201, a hard disk 302, a communication device 304, a RAM (Random Access Memory) 305, and a central processing unit 306 including a clock therein are connected by internal communication lines 303.

Programs that implement the analysis information management unit 205, analysis instrument control unit 207, communication unit 210, security information DB 203, and analysis-related information DB 204 are stored in the hard disk 302. When the operation terminal 102 is powered on, the central processing unit 306 loads basic software such as an operating system stored in the hard disk 302 into the RAM 305, for execution. Further, the central processing unit 306 loads and executes the programs stored in the hard disk 302 through the operating system, thereby embodying the analysis information management unit 205, analysis instrument control unit 207, and the communication unit 210 on the computer.

Each program may be stored in the hard disk 302 or RAM 305 in advance, or may be installed as necessary through a detachable storage medium or a communication medium (a carrier wave on or above communication lines) that can be used by the computer.

FIG. 4 shows a tag registration table 401 stored in the security information DB 203 in the first embodiment, and is constituted from a tag ID 402, a user ID 403, and an analysis start permission flag 404. When the analysis start permission flag 404 indicates "1", it indicates that permission for starting analysis is given to a user corresponding to a user ID in the field of the user ID 403. When the analysis start permission flag 404 indicates "0", it indicates that the permission is not given.

FIG. 5 shows a tag ID/sample ID association table (also referred to as an access management table) 501 stored in the security information DB 203 in the first embodiment, and is constituted from a tag ID 502 and a sample ID 503.

FIG. 6 shows an analysis performance information storage table 601 stored in the analysis-related information DB 204 in the first embodiment, and is constituted from a sample ID 602, a reaction process 603, an analysis method ID 604, a reagent ID 605, a gender 606, a comment 607, and an evaluation result 608.

The storage region of an operator tag ID management buffer for storing tag IDs of the tags 105 of operators such as the inspection engineer A106 is secured in the RAM 305 through the analysis information management unit 205 activated by the operating system, and the operator tag ID management buffer is cleared to zero.

Figure 7:
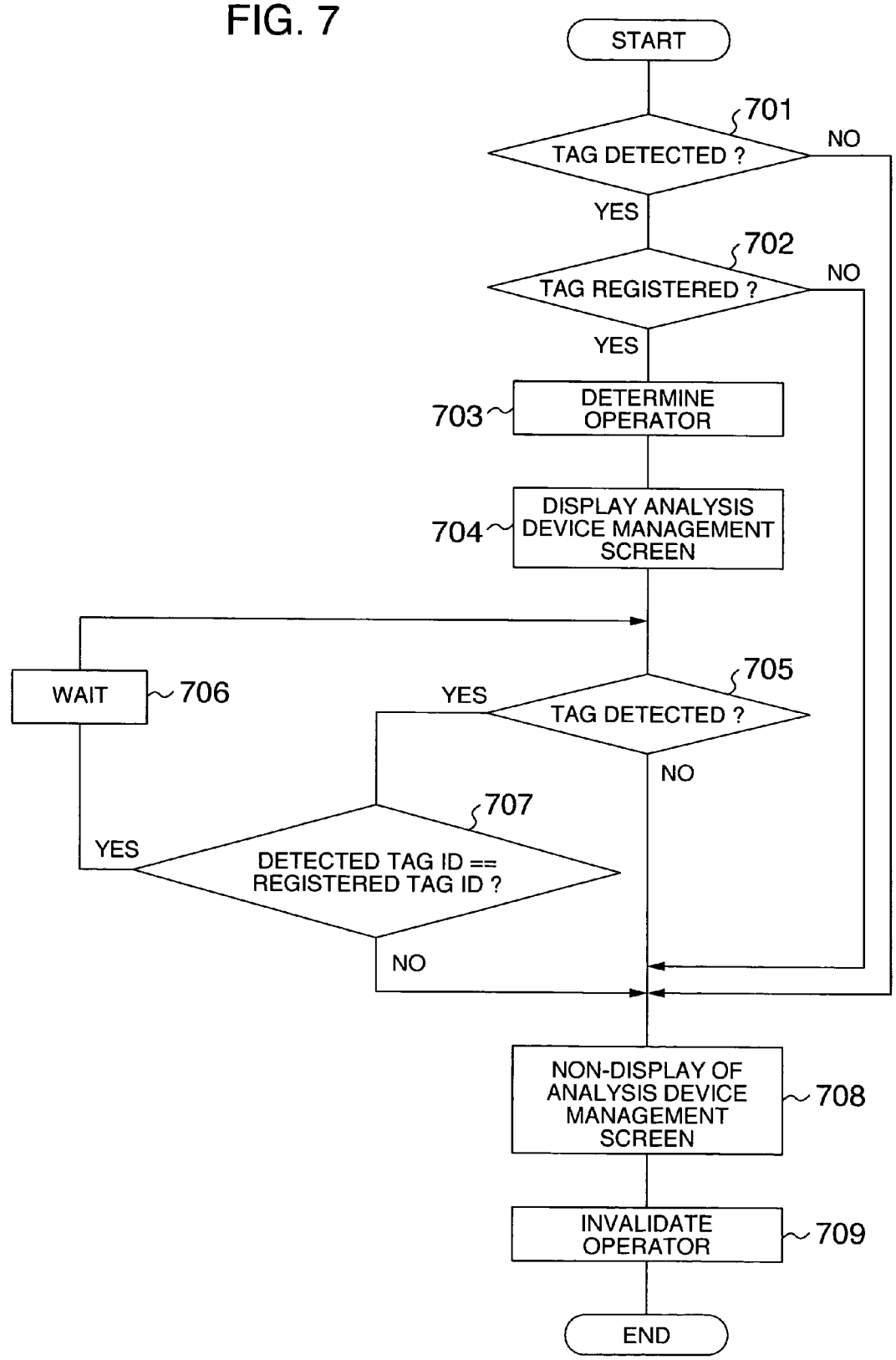
FIG. 7 shows a processing flow when the operation terminal 102 uses a reader 202 to detect a tag ID and controls display and non-display of the management screen of the analysis device based on the result of detection and the tag registration table 401, in the first embodiment.

FIG. 7 shows a processing flow when the operation terminal 102 uses the reader 202 to detect a tag ID and controls display and non-display of the management screen of the analysis device based on the result of detection and the tag registration table 401, in the first embodiment.

The analysis information management unit 205 uses the reader 202 to execute a read operation and determines whether the tag ID of the name tag 105 of the inspection engineer A106 has been detected or not, at step 701.

When the tag ID could be detected at step 701, the analysis information management unit 205 determines whether the detected tag ID is registered in the tag ID 402 of the tag registration table 401 at step 702.

When it has been determined at step 702 that the tag ID is registered in the tag ID 402 of the tag registration table 401, the analysis information management unit 205 determines the operator (herein, the inspection engineer A105) by storing the tag ID in the operator tag ID management buffer at step 703.

Then, the analysis information management unit 205 reads the initial setting corresponding to the tag ID to execute log in processing and displays the analysis device management screen at step 704. When locking is performed so as not to receive input from the keyboard 208 and the mouse 209 at step 704, the analysis information management unit 205 releases the locking.

Then, the operation terminal 102 periodically uses the reader 202 to execute the operation of reading tag IDs and determines whether the same tag ID has been consecutively detected. That is, when the tag could be detected at step 705 in the same manner as at step 701, the analysis information management unit 205 determines whether the detected tag ID matches the tag ID stored in the operator tag ID management buffer at step 703 or not, at step 707.

When it has been determined at step 707 that the same tag ID had been detected, the operation returns to step 705 after elapse of a certain time at step 706.

When it has been determined at step 705 that the tag could not been detected, the analysis information management unit 205 determines that the operator determined at step 703 has moved away from around the operation terminal 102, causes the analysis device management screen not to be displayed, and executes log out processing at step 708. Next, the analysis information management unit 205 clears the operator tag ID management buffer at step 709.

When it has been determined at step 707 that the detected tag ID does not match the tag ID stored in the operator tag ID management buffer, the analysis information management unit 205 executes processing at steps 708 and 709.

When the tag has not been detected at step 701 and when it has been determined at step 702 that the tag is not registered, the analysis information management unit executes processing at step 708.

In the first embodiment, when the analysis information management unit 205 could not detect the tag ID at step 705 and when it has been determined at step 707 that the detected ID does not match the tag ID stored in the operator tag ID management buffer, the analysis information management unit 205 performs the processing at steps 708 and 709. As an alternative, only non-display of the analysis device management screen may be executed, and session information such as the position, number, and display content of a current window may be stored in the analysis-related information DB 204 with the tag ID. Then, when the operator tag ID already stored in the operator tag ID management buffer and the newly detected ID match, the session information associated with the tag ID may be read, and the analysis device management screen may be displayed at step 704.

Figure 8:
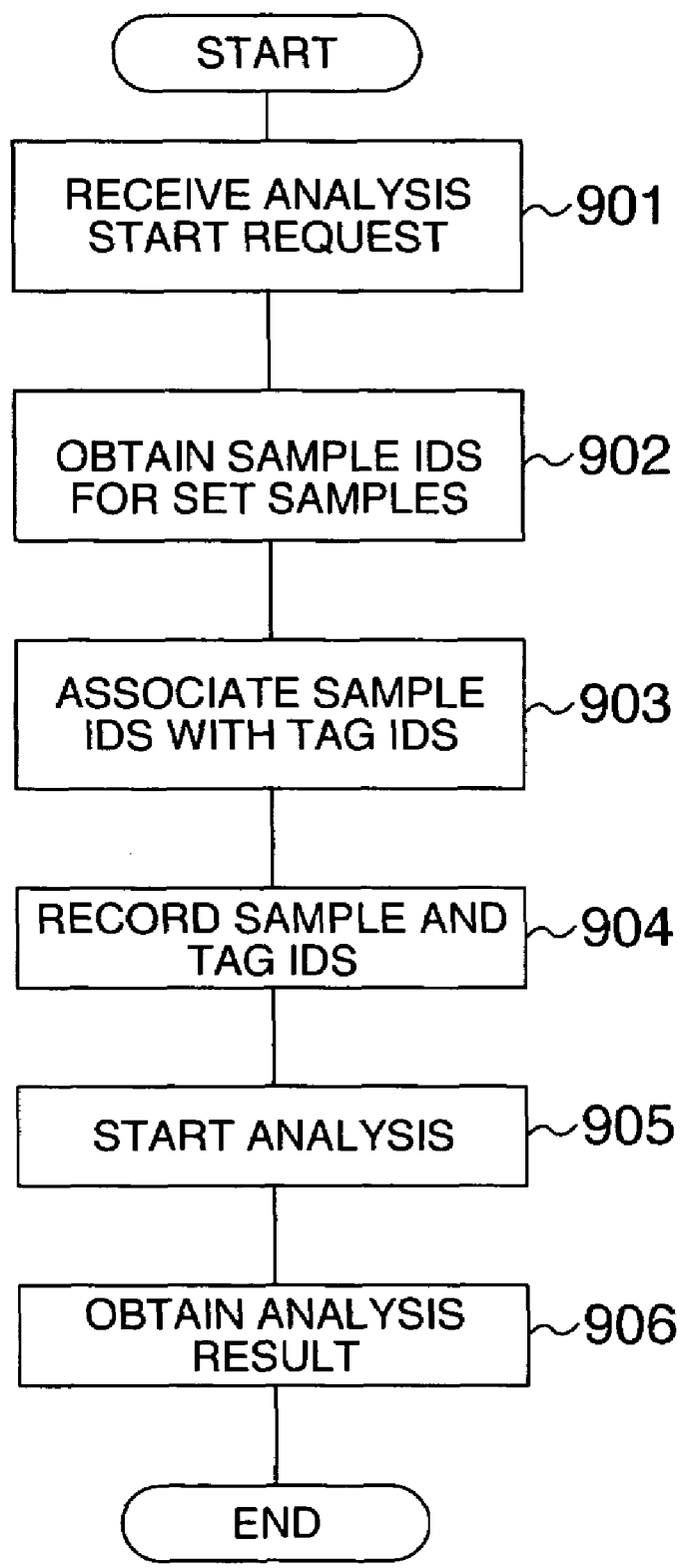
FIG. 8 shows a processing flow when the operation terminal 102 receives a request for starting analysis, defines correspondence between a user ID and a sample ID, and obtains analysis result information from the analysis instrument 103, in the first embodiment.

FIG. 8 shows a processing flow when the operation terminal 102 receives a request for starting analysis, defines correspondence between a user ID and a sample ID, and obtains analysis result information from the analysis instrument 103, in the first embodiment.

The analysis information management unit 205 receives a request for starting analysis from the keyboard 208 or the mouse 209 at step 901.

Next, the analysis information management unit 205 uses the analysis instrument control unit 206 to obtain sample IDs for all samples set in the analysis instrument 103. Specifically, the analysis instrument control unit 206 transmits a control command to the reaction management unit 211 through the communication units 207 and 210. The reaction management unit 211 controls the sample management unit 212 to obtain the sample IDs, for transmission to the reaction management unit 211. The reaction management unit 211 transmits the sample IDs to the analysis instrument control unit 206 through the communication units 210 and 207 at step 902.

The analysis information management unit 205 stores the sample IDs obtained at step 902 in the fields of the sample ID 503 in the tag ID/sample ID association table 501 and stores tag IDs stored in the operator tag ID storage buffer in the fields of the tag ID 502 at step 903.

The analysis information management unit 205 associates the tag IDs stored in the operator tag ID storage buffer, time, and the sample IDs obtained at step 902, for storage in the security information DB at step 904.

The analysis information management unit 205 starts the analysis using the analysis instrument control unit 206. Specifically, the analysis instrument control unit 206 transmits the control command to the reaction management unit 211 through the communication units 207 and 210. The reaction management unit 211 controls the sample management unit 212 and reagent management unit 213, thereby injecting samples and reagents necessary for the analysis, and then starting the analysis, at step 905.

The analysis information management unit 205 uses the analysis instrument control unit 207 to obtain the result of the analysis. Specifically, after step 905, the reaction management unit 211 transmits analysis result information to the analysis instrument control unit 207 through the communication units 210 and 207. The analysis instrument control unit 207 receives the result of the analysis, for transmission to the analysis information management unit 205 at step 906.

FIG. 9 shows a processing flow when the operation terminal 102 displays analytical performance information based on the access management table 501 created at step 903, in the first embodiment.

After the analysis information management unit 205 has received a request for displaying the analytical performance information through the keyboard 208 and the mouse 209, the analysis information management unit 205 identifies to which sample ID the analytical performance information to be displayed belongs by referring to the analysis performance information storage table 601, at step 1001.

The analysis information management unit 205 refers to the operator tag ID management buffer to obtain the tag ID for the operator, at step 1002.

The analysis information management unit 205 refers to the tag ID/sample ID association table 501, thereby checking whether the tag ID is associated with the sample ID, at step 1003.

When it has been found that they are associated with each other, the analysis information management unit 205 displays the analytical performance information at step 1004. When it has been found that there is no association, the analysis information management unit 205 displays a blank. If the analytical performance information to be displayed is a text, hidden characters such as * may be displayed at step 1005**.

At step 701 in the first embodiment, the analysis information management unit 205 receives personal authentication information using the noncontact tag and the reader. Alternatively, the operation terminal 102 may be provided with a personal authentication information receiving unit inside, the personal authentication information receiving unit may receive personal authentication information such as an ID and a password through the keyboard 208, and the analysis information management unit 205 may receive the personal authentication information. Still alternatively, the operation terminal 102 may be provided with a fingerprint authentication device, a voice pattern authentication device, or a face authentication device as well as the personal authentication information receiving unit. Then, the personal authentication information receiving unit may receive personal authentication information such as fingerprint image information from the fingerprint authentication information device, voice pattern authentication device, or face authentication device, and the analysis information management unit 205 may receive the personal authentication information.

Effects of the first embodiment will be described. In the first embodiment, the analysis device 101 updates the tag ID/sample ID association table 501 based on the tag ID detected by using the reader 202 and an event for starting analysis of a specific sample detected by the keyboard 208, mouse 209, and sample management unit 212. Then, based on the updated tag ID/sample ID association table 501 and the tag ID detected by the reader 202, access to analytical performance information is controlled.

With this arrangement, a person in charge of the analytical performance information can be promptly and accurately assigned for each sample. Further, tag ID detection and access control are repeatedly performed based on it. Thus, when the person in charge has moved to a position apart from the analysis device 101, non-display of the analysis device management screen is performed. Thus, leakage of the analytical performance information such as accidental browse of the analysis device management screen can be prevented.

As an example of a variation of the first embodiment, a group to which one or more tag IDs belong may be defined in advance. When the analysis device 101 uses the tag ID/sample ID association table 501 to control access to the analytical performance information, display or non-display of the analytical performance information may be determined, based on association between the group ID to which the tag ID detected by the analysis device 101 belongs and the sample ID.

This variation example will be described, using FIGS. 10 and 11.

FIG. 10 shows an example of a variation of the tag registration table 401 in the first embodiment, and is a tag registration table 1101 for associating the user ID 403 with a group ID 1102. The tag registration table 1101 in the variation of the first embodiment is obtained by adding the group ID 1102 to the tag registration table 401 in the first embodiment.

FIG. 11 shows a processing flow when the operation terminal 102 displays the analytical performance information based on the tag ID/sample ID accosiation table 501 created at step 903 in the variation example of the first embodiment, and is different from the processing flow shown in FIG. 9 in steps 1202 and 1203. Specifically, the analysis information management unit 205 refers to the operator tag ID management buffer to obtain the tag ID, and converts the tag ID to the group ID by referring to the tag registration table 1101, at step 1202.

Next, the analysis information management unit 205 refers to the tag ID/sample ID association table 501, thereby searching for the tag ID corresponding to the sample ID identified at step 1201. Then, the analysis information management unit 205 refers to the tag registration table 1101 to convert the tag ID to the group ID. Next, the analysis information management unit 205 compares the group ID obtained at step 1202 with the group ID obtained at this step and determines whether they match, at step 1203.

If it has been determined at step 1203 that they match, the analysis information management unit 205 executes the processing at step 1204. If it has been determined that they do not match, the analysis information management unit 205 executes the processing at step 1205.

According to this variation example, even if the person in charge for obtaining reaction processes and the result of analysis using the analysis device 101 is different from the person in charge for evaluating the reaction processes and the result of analysis, the tags assigned to both of the persons in charge are defined to belong to the same group. Both of the persons in charge can thereby refer to the analysis performance information and can therefore perform business in their charge.

Next, a second embodiment of the present invention will be described.

In the first embodiment, the analysis device 101 detects one tag, and identifies the operator based on the detected tag and the tag registration table 401. In the second embodiment, a plurality of tags is detected, and based on the order of detecting the tags and the tag registration table 401, the operator, browser, and an unregistered person are identified, and this group is managed as a community. Then, based on what personnel constitute the community, access to analytical performance information is controlled.

A difference between the first and second embodiments will be described using FIGS. 12 to 19. In the second embodiment, the analysis information management unit 205 controls access to the analytical performance information based on a group ID and the tag ID/sample ID association table 501.

Figure 12:
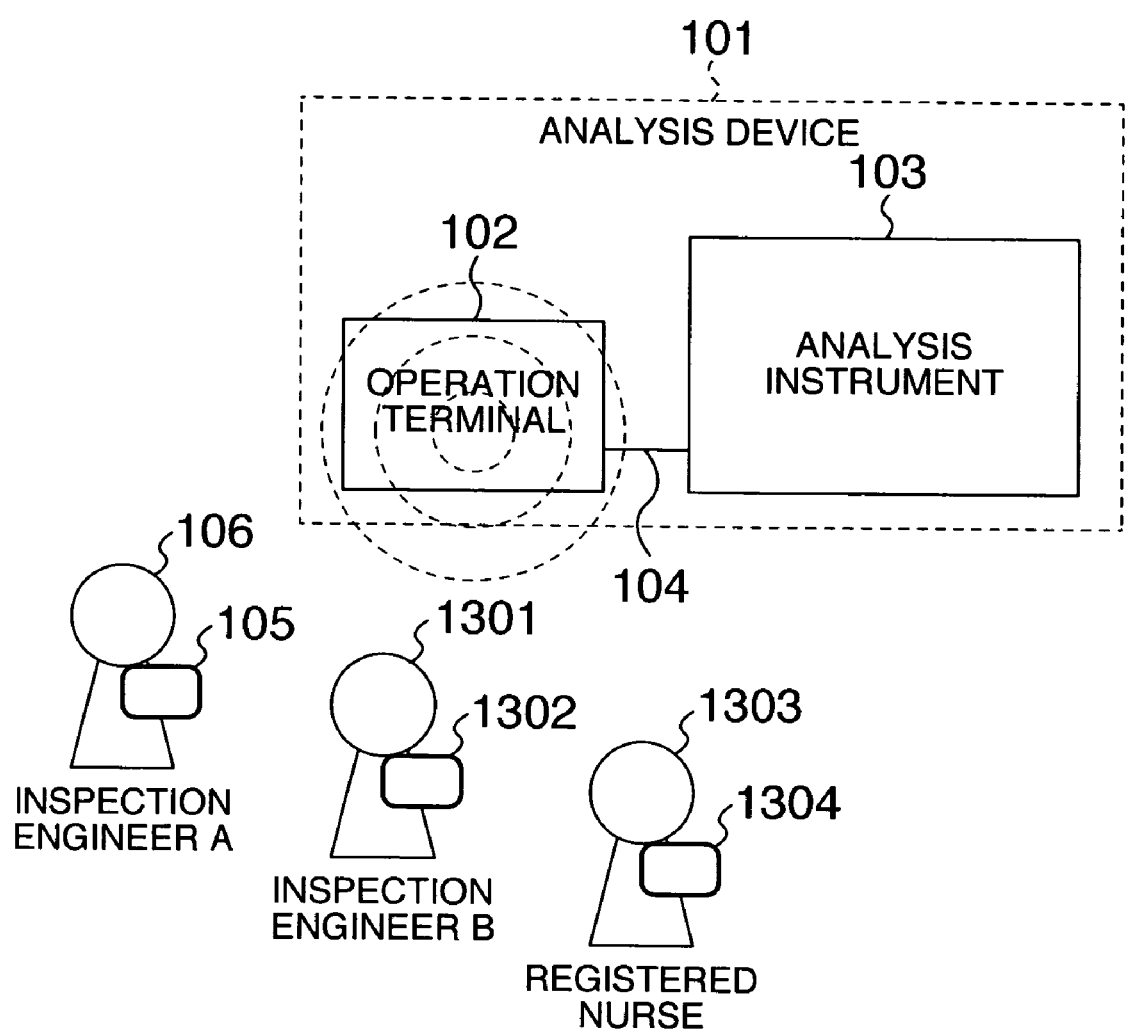
FIG. 12 shows a utilized image of the analysis device 101 in a second embodiment of the present invention.

FIG. 12 is a diagram showing a utilized image of the analysis device 101 in the second embodiment. As in the first embodiment, the inspection engineer A106, an inspection engineer B1301, and an inspection engineer C1303 wear the name tag 105, a name tag 1302, and a name tag 1304, respectively. In each of the name tags 105, 1302, and 1304, a tag with a unique ID assigned thereto is embedded. In the second embodiment, the analysis device 101 includes the reader 202 for simultaneously detecting a plurality of tags. As the reader 202, the reader that has adopted the frequency division multiple access system is put to practical use.

FIG. 13A shows a community management buffer 1400 (A) constituted from a personnel count management region 1401 and a personnel tag ID storage region 1402. FIG. 13B shows a detected tag ID management buffer 1400 (B) constituted from a detected tag count management region 1403 and a detected tag ID storage region 1404. These buffers 1401 to 1405 are collectively referred to as temporary buffers.

FIG. 14A shows an operator tag ID storage buffer 1501 in the second embodiment. FIG. 14B shows a browser tag ID management buffer 1500 (B) constituted from a browser count management region 1502 and a browser tag ID storage region 1503. FIG. 14C shows an unregistered person tag ID management buffer 1500 (C) constituted from an unregistered person count management region 1504 and an unregistered person tag ID storage region 1505. These buffers 1501 to 1505 are collectively referred to as role buffers.

Storage regions of the respective buffers shown in FIGS. 13A, 13B, 14A, 14B, and 14C are secured in the RAM 305 by the analysis information management unit 205 activated by the operating system, and the respective buffers are cleared to zero.

The storage region of a personal identification data filter buffer for controlling access to the analytical performance information based on the operator tag ID storage buffer 1501 and the browser tag ID management buffer 1500(B) is secured in the RAM 305 by the analysis information management unit 205 activated by the operating system, and the personal identification data filter buffer is cleared to zero.

Figures 15A, 15B:
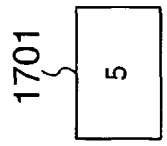
FIG. 15A shows a part of a personal identification data display buffer for managing the analytical performance information displayed on the management screen of the analysis device, in the second embodiment.
FIG. 15B shows a part of a personal identification data display buffer for managing the analytical performance information displayed on the management screen of the analysis device, in the second embodiment.

FIGS. 15A and 15B show parts of a personal identification data display buffer for managing the analytical performance information displayed on the analysis device management screen, in the second embodiment. A display data count management region 1701 in FIG. 15A and a display data storage region 1700 in FIG. 15B are regions for storing the text of the analytical performance information displayed on the analysis device performance screen. In the second embodiment, though a personal identification data region includes a region for storing graphs, a region for storing images, and the like, a description of them will be omitted. The storage region of the personal identification data display buffer is secured in the RAM 305 by the analysis information management unit 205 activated by the operating system, and the personal identification data display buffer is cleared to zero.

Figure 17:
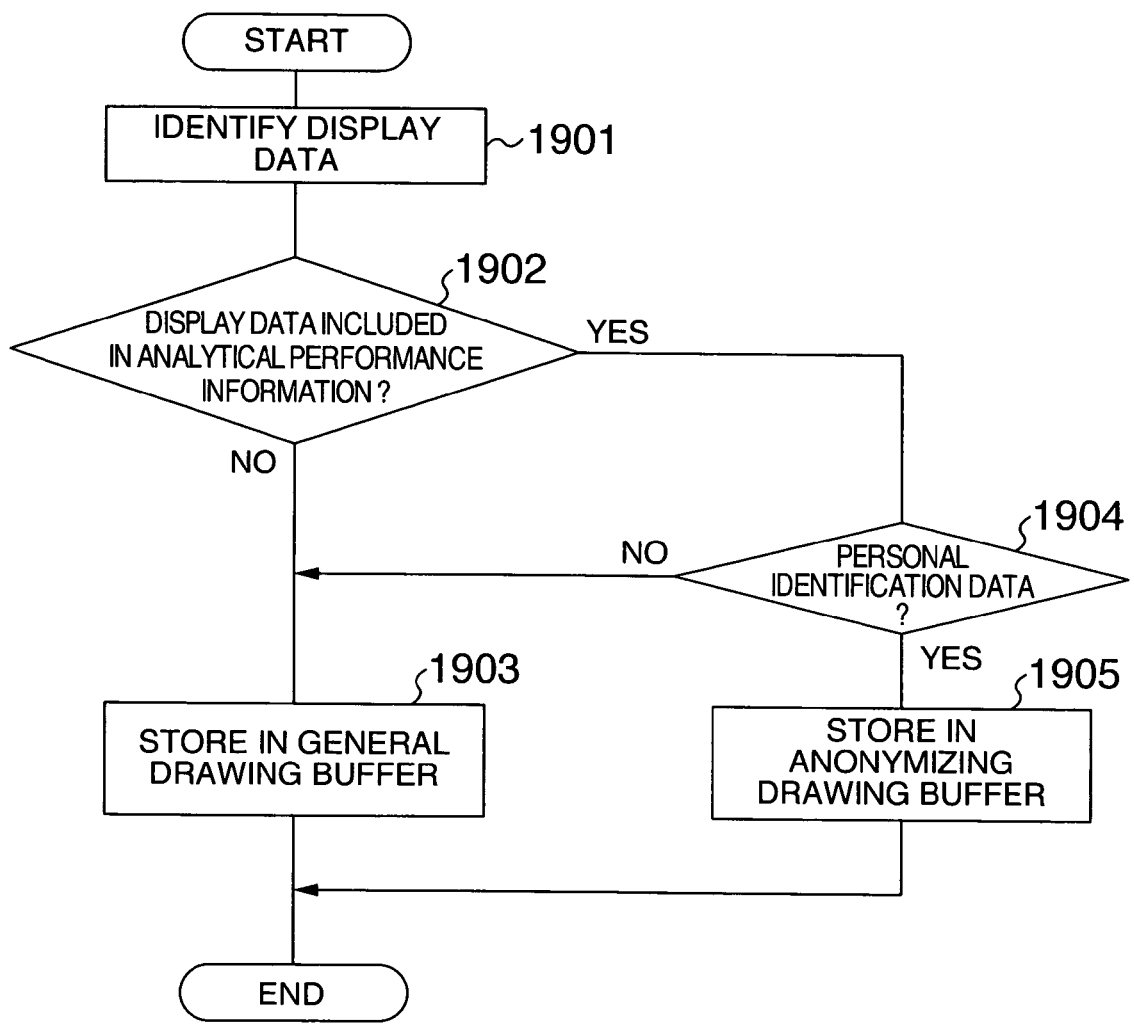
FIG. 17 shows a processing flow when the operation terminal 102 stores in a general drawing buffer or an anonymizing drawing buffer the content to be displayed on the management screen of the analysis device for each data, in the second embodiment.

FIG. 17 shows a processing flow when the operation terminal 102 stores in a general drawing buffer or an anonymizing drawing buffer the content to be displayed on the analysis device management screen for each data. In the second embodiment, the anonymizing drawing buffer stores data that might invade privacy of a patient when combined with other information and provides low importance in an estimating operation. Other data is stored in the general drawing buffer.

The analysis information management unit 205 identifies data to be displayed based on a request received through the keyboard 208 and the mouse 209 at step 1901.

The analysis information management unit 205 determines whether the identified data matches data in the analysis performance information storage table 601 by referring to the analysis performance information storage table 601, at step 1902.

If it has been determined that the identified data does not match the data in the analytical performance storage table 601, the analysis information management unit 205 stores the identified data in the general drawing buffer at step 1903.

If it has been determined at step 1902 that the identified data matches the data in the analytical performance storage table 601, the analysis information management unit 205 determines whether the identified data is personal identification data or not, by referring to the anonymizing drawing buffer, at step 1904.

If it has been determined at step 1904 that the identified data is the personal identification data, the analysis information management unit 205 stores the identified data in the anonymizing drawing buffer and completes this processing flow at step 1905.

If it has been determined at step 1904 that the identified data is not the personal identification data, the analysis information management unit 205 stores the identified data in the general drawing buffer, at step 1903.

Figure 16:
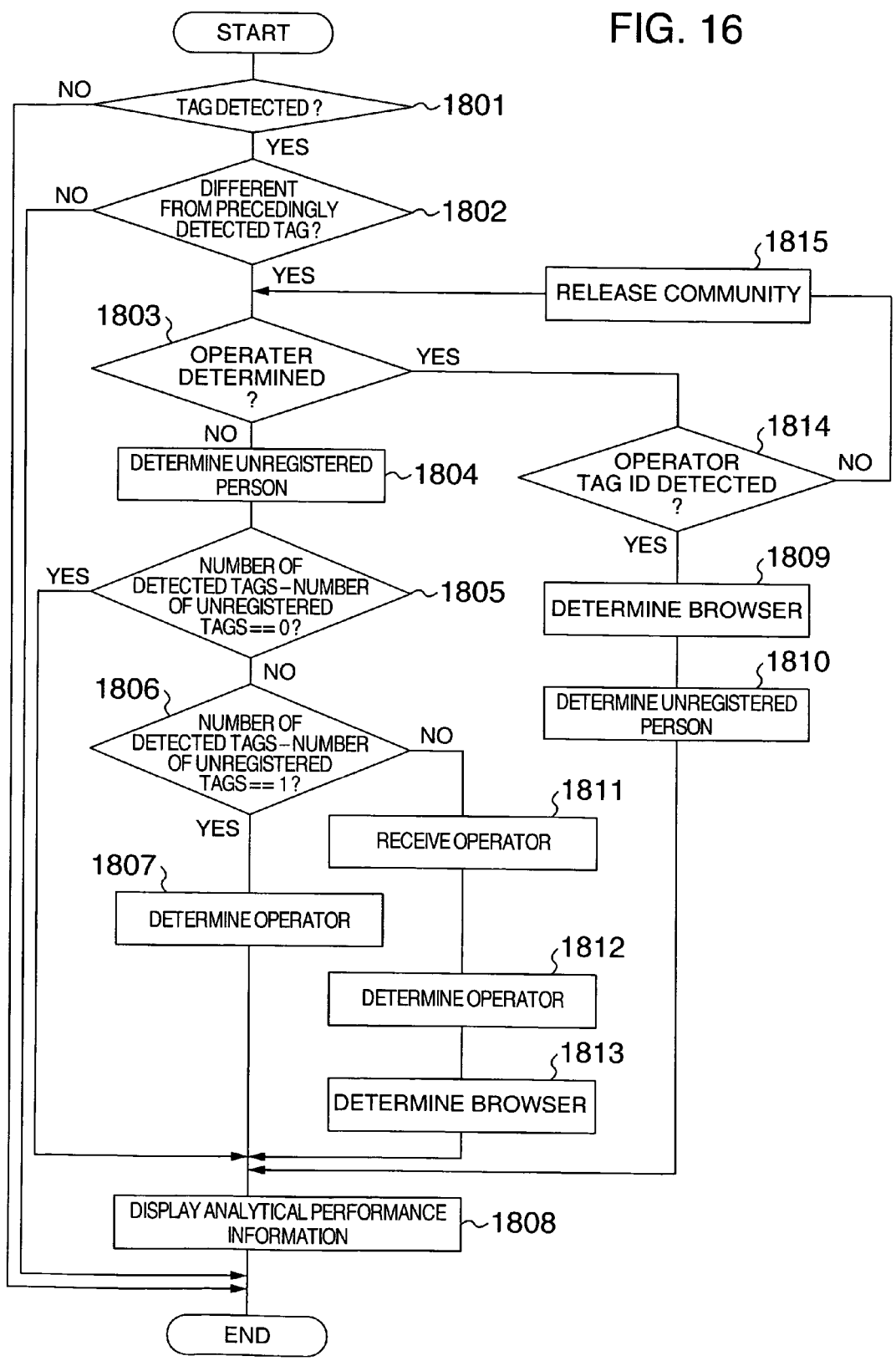
FIG. 16 shows a processing flow when the operation terminal 102 detects one or more tags and manages its difference from a tag detected precedingly, thereby preparing and updating a community.

FIG. 16 shows a processing flow when the operation terminal 102 detects one or more tags and manages its difference from a tag detected precedingly, thereby preparing and updating a community.

The analysis information management unit 205 uses the reader 202 to perform processing for reading tags at step 1801. When the analysis information management unit 205 has detected the tags, the analysis information management unit 205 stores the number of the tags in the detected tag count management region 1403 of the detected tag ID storage buffer 1400(B), stores the tag IDs of the tags in the detected tag ID storage region 1404, and compares the community management buffer with the detected tag ID management buffer, for detection of a difference therebetween, at step 1802. Specifically, the analysis information management unit 205 compares the personnel tag ID storage region 1402 of the community management buffer 1400(A) with the detected ID storage region 1404, thereby detecting the difference therebetween.

When the analysis information management unit 205 has compared the community management buffer with the detected tag ID management buffer and detected the difference at step 1802, the analysis information management unit 205 refers to the operator tag ID storage buffer 1501 to determine whether the operator tag ID storage buffer is cleared to zero or not, thereby determining whether the operator is determined or not, at step 1803. In the second embodiment, when the buffer is not cleared to zero, it is determined that the operator is determined.

When it has been found at step 1803 that the operator is not determined, the analysis information management unit 205 refers to the tag registration table 401 and the detected tag ID storage region 1404, searches for tag IDs stored in the detected tag ID storage region 1404 but not stored in the tag registration table 401, stores the number of the tag IDs in the unregistered person count management region 1504 of the unregistered person tag ID management buffer 1500(C), and stores the tag IDs in the unregistered person tag ID storage region 1505, at step 1804.

The analysis information management unit 205 calculates a difference between the value stored in the detected tag count storage region 1403 and the value stored in the unregistered person count management region 1504, and determines whether the calculated value is zero or not, at step 1805.

When it has been determined at step 1805 that the calculated value is not zero, the analysis information management unit 205 determines whether the calculated value is one or not, at step 1806.

When it has been determined at step 1806 that the calculated value is one, the analysis information management unit 205 searches for a tag ID registered in the tag registration table 401 among the tag IDs stored in the detected tag ID storage region 1404, for storage in the operator tag ID management buffer, at step 1807.

The analysis information management unit 205 executes display processing of the analytical performance information at step 1808.

When no tag has been detected at step 1801, or when no difference has been detected at step 1802, the analysis information management unit 205 completes this processing flow.

When it has been found at step 1803 that the operator is determined, the analysis information management unit 205 searches for a tag ID stored in the operator tag ID storage buffer 1501 from the detected tag ID storage region 1404 of the detected tag ID management buffer 1400(B), at step 1814.

When the tag ID has not been detected at step 1814, the analysis information management unit 205 clears the operator tag ID storage buffer 1501, browser tag ID management buffer 1500(B), and unregistered person tag ID management buffer 1500(C), and community management buffer 1400(A) to zero, thereby releasing the community, at step 1815.

When the tag ID has been detected at step 1814, the analysis information management unit 205 searches for tag IDs registered in the tag registration table 401 among the tag IDs stored in the detected tag ID storage region 1404, stores the number of tags corresponding to the tag IDs in the browser tag count management region 1502 of the browser tag ID management buffer 1500(B), and stores the tag IDs in the browser tag ID storage region 1503 at step 1809.

The analysis information management unit 205 searches for tag IDs that are not registered in the tag registration table 401 among the tag IDs stored in the detected tag ID storage region 1404 of the detected tag ID management buffer 1400(B), stores the number of tags corresponding to the tag IDs in the unregistered person count management region 1504 of the unregistered person tag ID management buffer, stores the tag IDs in the unregistered person tag ID storage region 1505 at step 1810, and executes processing at step 1808.

When it has been determined at step 1805 that the calculated value is zero, the analysis information management unit 205 executes processing at step 1808.

When it has been determined at 1806 that the calculated value is not one, the analysis information management unit 205 searches for a tag ID registered in the tag registration table 401 among the tag IDs stored in the detected tag ID storage region 1404, searches for a user ID corresponding to the tag ID by referring to the tag registration table 401 for display on the display unit 201, and receives the user ID using the keyboard 208 and the mouse 209, at step 1811.

The analysis information management unit 205 refers to the tag registration table 401, thereby searching for the tag ID corresponding to the user ID, and stores the tag ID in the operator tag ID storage region 1501 of the operator tag ID management buffer, at step 1812.

The analysis information management unit 2G5 stores in the browser tag count management region 1502 of the browser tag ID management buffer the number of tag IDs registered in the tag registration table 401 among tag IDs stored in the detected tag ID storage region 1404 excluding the tag IDs stored in the operator tag ID storage region 1501 of the operator tag ID management buffer at step 1812, and stores the tag IDs in the browser tag ID storage region of the browser tag ID management buffer at step 1813. Then, the analysis information management unit 205 executes the processing at step 1808.

Figure 18:
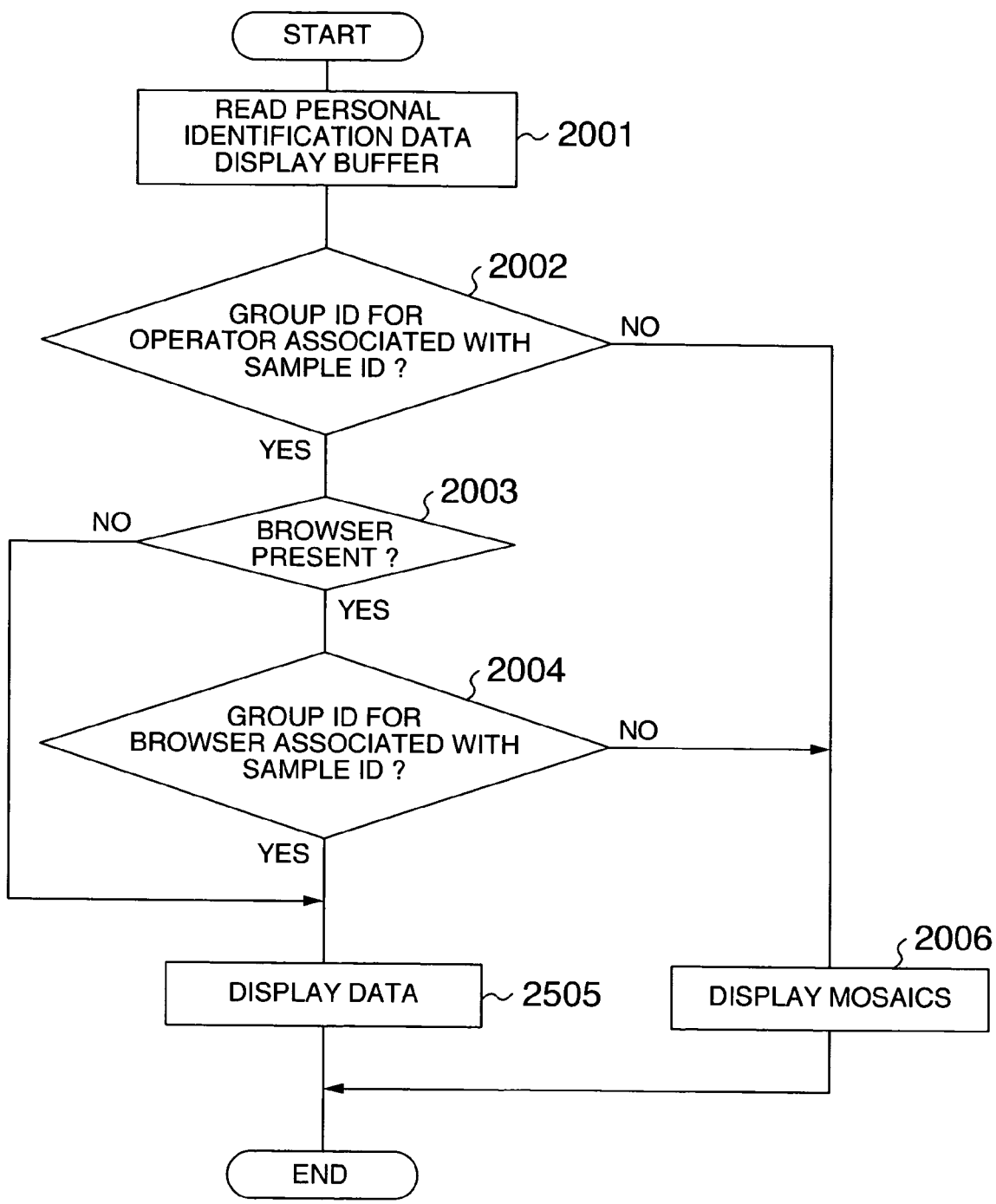
FIG. 18 shows a processing flow when the operation terminal 102 controls access to data in the personal identification data display buffer based on personnel constituting the community.

FIG. 18 shows a processing flow when the operation terminal 102 controls access to data in the personal identification data display buffer based on personnel constituting the community.

The analysis information management unit 205 refers to the personal identification data display buffer, thereby identifying data to be displayed, at step 2001.

The analysis information management unit 205 searches for the sample ID associated with the data and obtains the group ID associated with the sample ID in the same procedure as at step 1202. The analysis information management unit 205 obtains the tag ID stored in the operator tag ID storage region of the operator tag ID management buffer, and obtains the group ID associated with the tag ID in the same procedure as at step 1202. Then, the analysis information management unit 205 compares these two group IDs to determine whether these group IDs match or not, at step 2002.

When it has been determined at step 2002 that they match, the analysis information management unit 205 refers to the browser tag count management region of the browser tag ID management buffer to determine whether the number of tag IDs is zero or not, at step 2003.

When it has been determined at step 2003 that the number of the tag IDs is not zero (there exists a browser), the analysis information management unit 205 determines whether the ID for the group to which the browser belongs is associated with the sample ID in the same procedure as at step 2002, at step 2004.

When it has been determined at step 2004 that the group ID is associated with the sample ID, the analysis information management unit 205 displays the data identified at step 2001, at step 2005.

When it has been determined at step 2002 that the group IDs do not match, the analysis information management unit 205 displays hidden characters such as *, thereby completing the processing flow at step 2006**.

When it has been determined at step 2003 that the number of the tag IDs is zero (there exists no browser), the analysis information management unit 205 executes processing at step 2005. When it has been determined at step 2004 that the group ID to which the browser belongs is not associated with the sample ID, the analysis information management unit 205 executes the processing at step 2006.

In this embodiment, when it has been determined at step 2002 that the group IDs do not match, the hidden characters are displayed. No display of the hidden characters however, may be performed. The effects of the analysis device according to the second embodiment will be described.

In the second embodiment, the analysis device 101 detects a plurality of tags, identifies the operator, browser, and unregistered person based on the order of detecting the tags and the tag registration table 401. Then, the analysis device 101 manages this group as the community, and controls access to the analytical performance information based on what personnel constitute the community.

With this arrangement, as shown in the processing flow in FIG. 16, the operator, browser, and unregistered person are identified based on the order of detecting a plurality of tags and the tag registration table 401. Then, this group is managed as the community, and access to analytical performance information is controlled based on what personnel constitute the community.

With this arrangement, when a plurality of inspection engineers evaluate the result of analysis while referring to the management screen of an analysis device, access to the analytical information such as display of all analytical performance information required for evaluation, anonymous display of the information, and non-display of the information can be controlled according to a combination of the inspection engineers who participate in the evaluation. Further, when the tag assigned to the operator could not be detected, the community is released, and reconstruction of the community is performed. This facilitates taking over of roles between the persons in charge.

Next, a third embodiment will be described.

In the first embodiment, information on access control over tags for the analysis device 101 was registered in advance in the analysis device 101. The third embodiment is different from the first embodiment in that access management information is dynamically registered in the analysis device after the validity of a tag has been confirmed.

The difference between the first embodiment and the third embodiment will be described below with reference to FIGS. 19 to 24.

FIG. 21 shows a utilized image of the analysis device 101, an analysis device 2310, and an analysis device 2311 in the third embodiment. The difference between the first embodiment and the third embodiment is that the analysis device 101, analysis device 2310, and analysis device 2311 in the third embodiment are connected to a management server 2305 via a network 2304, for mutual transmission and reception of data. Like the analysis device 101, the analysis device 2310 is constituted from an operation terminal 2301, a cable 2303, and an analytical instrument 2302. Likewise, the analysis device 2311 is also constituted from an operation terminal 2306, a cable 2312, and an analytical instrument 2307. Though the management server 2305 includes a fingerprint authentication device 2309, a face authentication device or an intravenous pattern authentication device may also be used in place of the fingerprint authentication device 2309. In the third embodiment, the management server 2305 is installed in the doorway of the inspection room. Though three analysis devices are installed in the third embodiment, no limitation is imposed on the number of the analysis devices.

Figure 19:
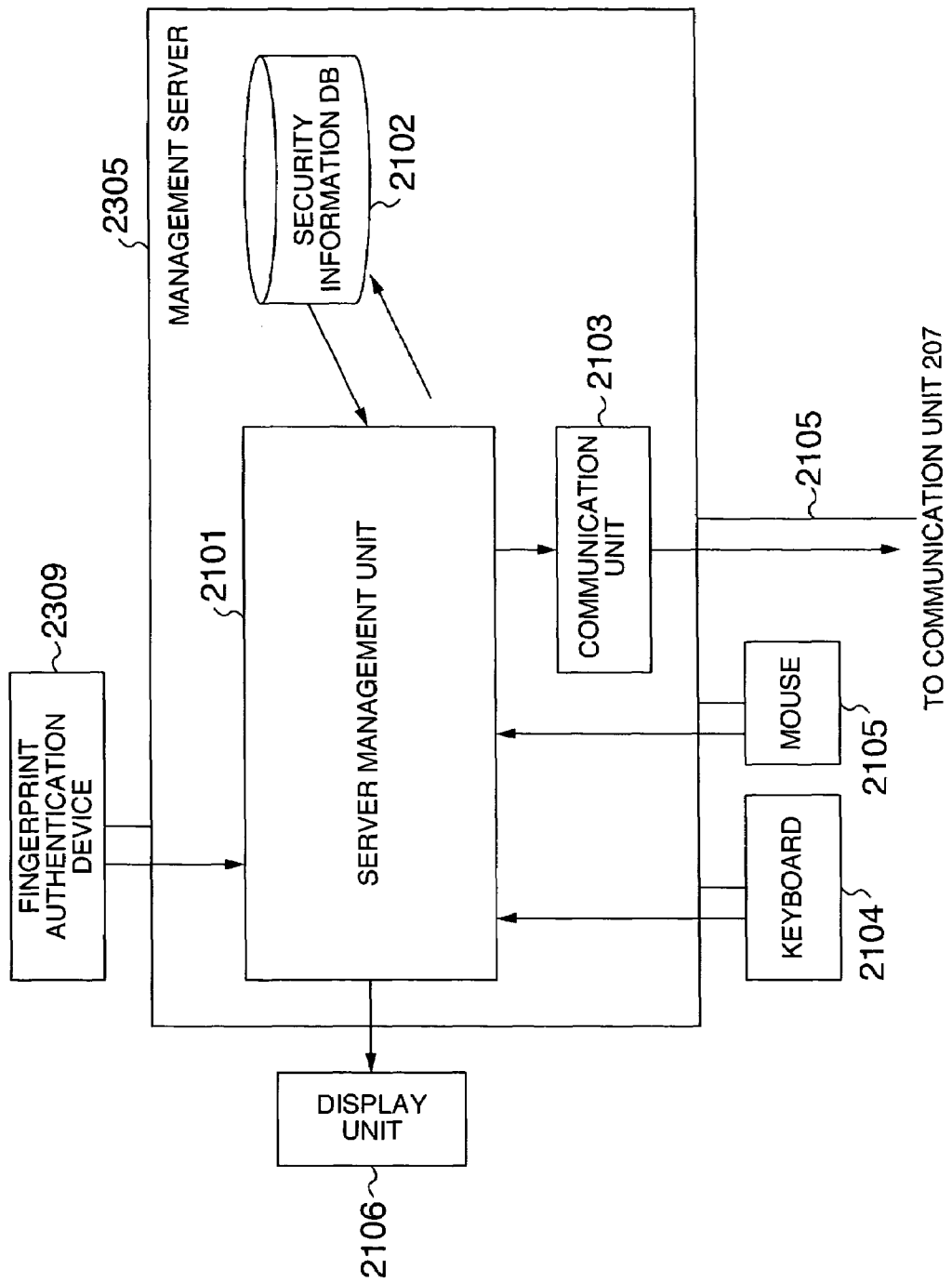
FIG. 19 is a system block diagram of a management server 2305 in a third embodiment of the present invention.

FIG. 19 is a system block diagram showing the management server 2305 in the third embodiment. The management server 2305 is constituted from a server managing unit 2101, the fingerprint authentication device 2309, a security information DB 2102, a communication unit 2103, a keyboard 2104, a mouse 2105, and a display unit 2106.

FIG. 20 shows a tag management table 2201 stored in the security information DB 2102 of the management server 2305. The tag management table 2201 is constituted from authentication information 2202 for authenticating individuals and tag management information. The tag management information is constituted from a tag ID 2203, a user ID 2204, analysis start permission 2205, a group ID 2206, a network address 2207, and a tag management flag 2208. The analysis start permission 2205 is the information indicating access permission. The network address 2207 is the network address uniquely assigned to each analysis device. The tag management flag 2208 is the flag indicating that an associated tag is valid or invalid in the inspection room. If the value of the tag management flag 2208 is one, it indicates that the associated tag is valid in the inspection room. If the value of the tag management flag 2208 is zero, it indicates that the associated tag is invalid in the inspection room. Though one network address is defined for each tag ID in the third embodiment, a plurality of network addresses may also be defined.

Figures 22A, 22B:
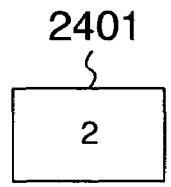
FIG. 22A shows a registered tag count management region of a tag registration table managed by the analysis device 101, analysis device 2310, and analysis device 2311, in the third embodiment.
FIG. 22B shows a registered tag associated information storage region of the tag registration table managed by the analysis device 101, analysis device 2310, and analysis device 2311, in the third embodiment.

FIGS. 22A and 22B show a tag registration table managed by the analysis device 101, analysis device 2310, and analysis device 2311 in the third embodiment. The tag registration table is constituted from a registered tag count management region 2401 shown in FIG. 22A and a registered tag associated information storage region 2402 shown in FIG. 22B. The registered tag associated information storage region 2402 is constituted from a tag ID 2403, a user ID 2404, analysis start permission 2405, and a group 2406.

Figure 25A:
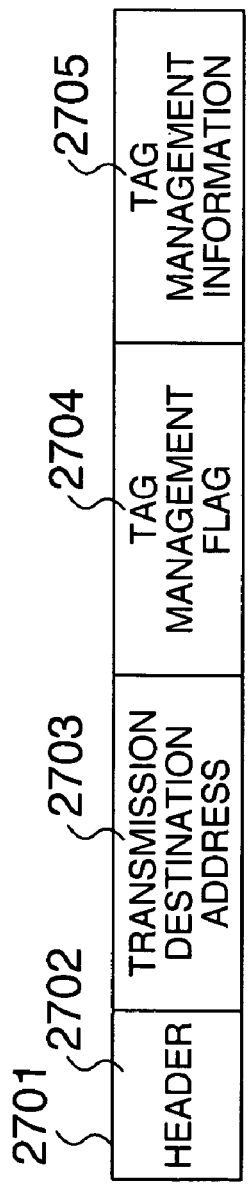
FIG. 25A shows a request message format when the management server 2305 notifies validation or invalidation of a tag to the analysis device 101, analysis device 2310, and analysis device 2311 via the network 2304, in the third embodiment.
Figure 25B:
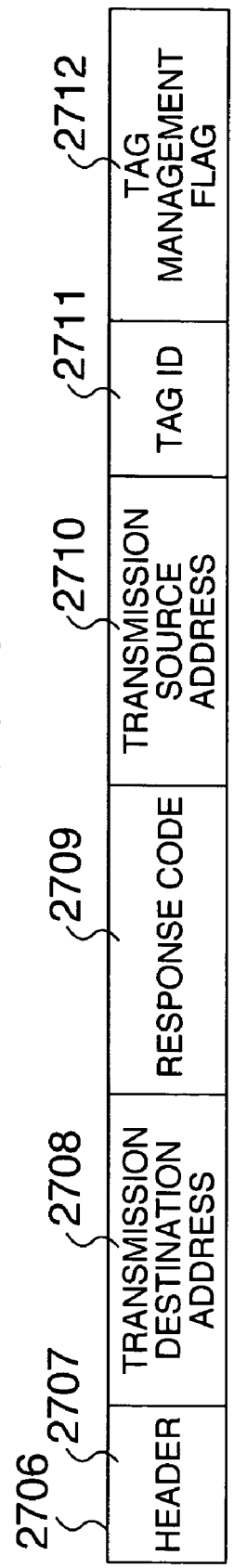
FIG. 25B shows a response message format when the management server 2305 notifies validation or invalidation of a tag to the analysis device 101, analysis device 2310, and analysis device 2311 via the network 2304, in the third embodiment.

FIG. 25A shows a message format when the management server 2305 notifies validation or invalidation of a tag to the analysis device 101, analysis device 2310, and analysis device 2311 via the network 2304. The message format is constituted from a request message format 2701 shown in FIG. 25A and a response message format 2706 shown in FIG. 25B. The request message format 2701 is constituted from a header 2702, a transmission destination address 2703, a tag management flag 2704, and tag management information 2705. In the third embodiment, the tag management information 2705 includes the tag ID 2203, user ID 2204, analysis start permission 2205, and group ID 2206. The response message format 2706 is constituted from a header 2707, a transmission destination address 2708, a response code 2709, a transmission source address 2710, a tag ID 2711, and a tag management flag 2712.

Figure 23:
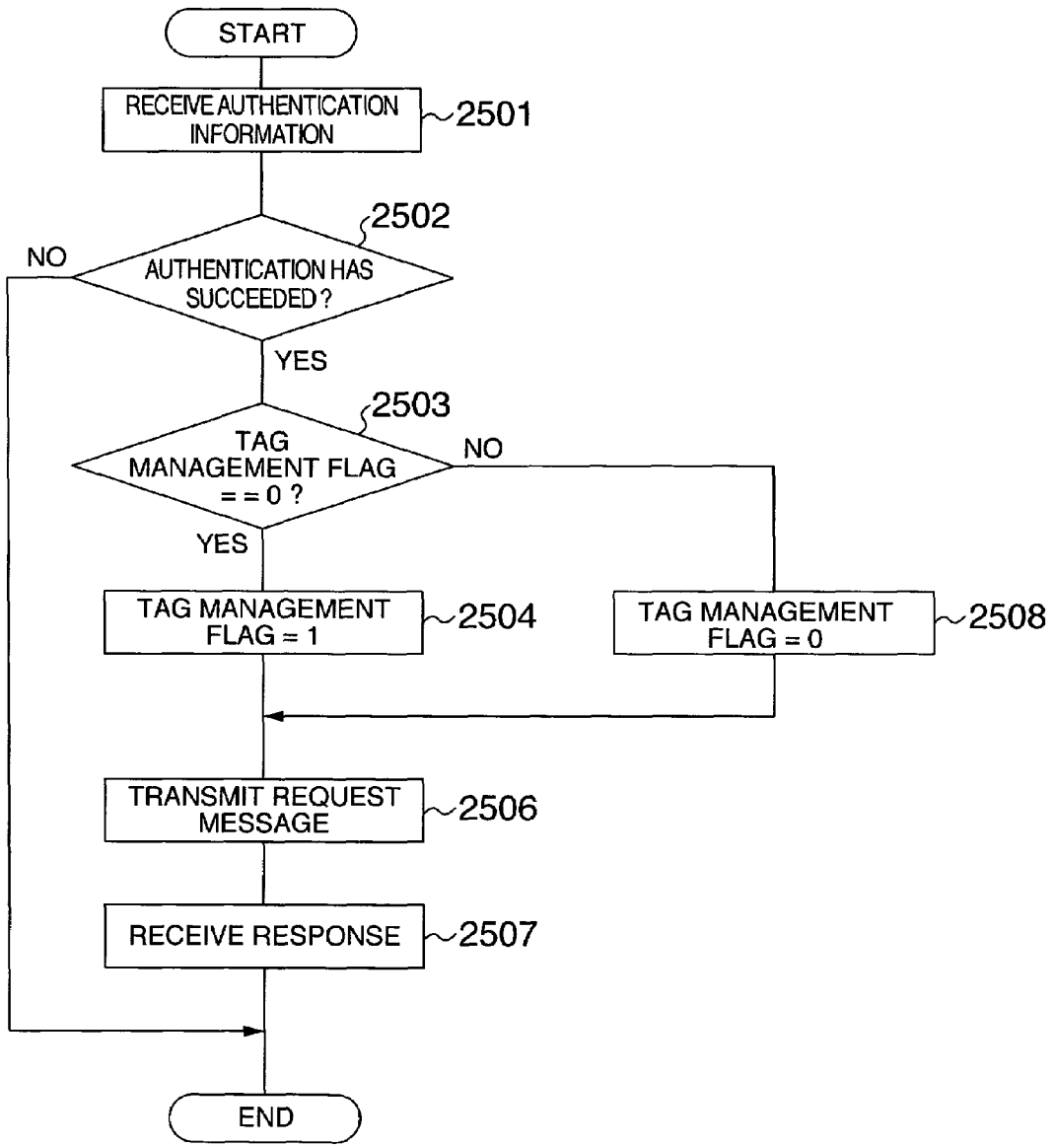
FIG. 23 shows a processing flow when the management server 2305 uses a fingerprint authentication device 2309 to receive fingerprint authentication information, selects a tag associated with the authentication information when fingerprint authentication has succeeded, and transmits tag related information pertinent to the tag to a corresponding analysis device via a network 2304, in the third embodiment.

FIG. 23 shows a processing flow when the management server 2305 uses the fingerprint authentication device 2309 to receive fingerprint authentication information, selects a tag associated with the authentication information when fingerprint authentication has succeeded, and transmits tag related information pertinent to the tag to a corresponding analysis device via the network 2304. First, the server managing unit 2101 receives fingerprint authentication information from the fingerprint authentication device 2309, at step 2501.

The server managing unit 2101 determines whether authentication information matching the fingerprint authentication information is stored in the authentication information 2202 of the tag management table 2201 or not, thereby determining whether authentication has succeeded or not, at step 2502.

When it has been determined at step 2502 that the authentication has succeeded, the server managing unit 2101 determines whether the value of the tag management flag 2208 of the tag management table 2201 is zero or not, at step 2503.

When it has been determined at step 2503 that the value of the tag management flag 2208 is zero, the server managing unit 2101 creates a request message, and stores "one" in the tag management flag 2704, at step 2504.

The server managing unit 2101 stores appropriate data in the header 2702, transmission destination address 2703, and tag management information 2705 of the request message, and transmits the message to the corresponding analysis device via the network, using the communication unit 2103, at step 2506.

At step 2506, the server managing unit 2101 searches for the transmission destination address 2703 and the tag management information 2705 using the authentication information and the tag ID as keys, and stores appropriate values in the corresponding regions of the request message. Next, the server managing unit 2101 receives a response message, and displays an alarm message or a malfunction alarming message on the display unit 2106 when detecting an abnormality.

When the authentication has failed at step 2502, the server managing unit 2101 completes the processing flow.

When it has been determined at step 2503 that the value of the tag management flag 2208 is one, the server managing unit 2101 creates the request message, stores "zero" in the tag management flag 2704 at step 2508, and executes the processing at step 2506.

Figure 24:
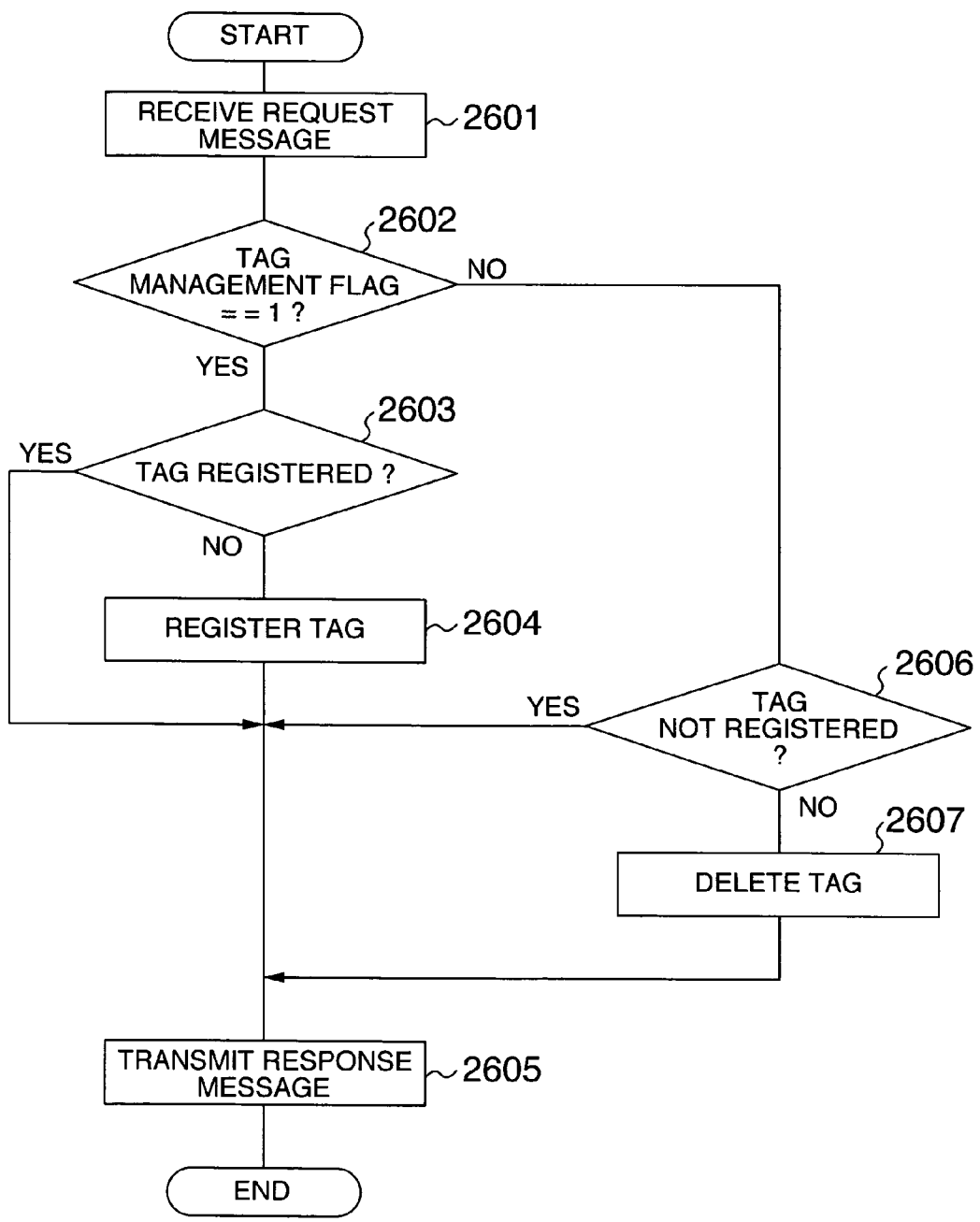
FIG. 24 shows a processing flow when the analysis device 101, analysis device 2310, an analysis device 2311 receives the tag related information via the network 2304, for storage, in the third embodiment.

FIG. 24 shows a processing flow when the analysis device 101, analysis device 2310, or analysis device 2311 in the third embodiment receives the tag related information via the network 2304, for storage.

The analysis information management unit 205 receives a request message from the management server 2305 using the communication unit 210, at step 2601.

The analysis information management unit 205 determines whether the value of the tag management flag 2704 of the request message is one or not, at step 2602.

when it has been determined at step 2602 that the value of the tag management flag 2704 of the request message is 1 (one), the analysis information management unit 205 determines whether the tag ID in the tag management information 2705 appended to the request message is registered in the registered tag associated information storage region 2402 in the tag registration table or not, at step 2603.

When it has been determined at step 2603 that the tag ID is not registered, the analysis information management unit 205 registers the tag ID in the registered tag associated information storage region 2402 of the tag registration table, and adds 1 (one) to the value in the registered tag count management region 2401 at step 2604.

After creating a response message, the analysis information management unit 205 transmits the response message to the management server 2305 through the communication unit 210, at step 2605.

If it has been determined at step 2602 that the value of the tag management flag 2704 of the request message is not 1 (one), the analysis information management unit 205 determines whether the tag ID in the tag management information 2705 appended to the request message is registered in the registered tag associated information storage region 2402 in the tag registration table or not, at step 2606.

If it has been determined at step 2606 that the tag ID is registered, the analysis information management unit 205 deletes the tag ID from the registered tag associated information storage region 2402 in the tag registration table, subtracts 1 (one) from the value of the registered tag count management region 2401 at step 2607, and executes the processing at step 2605. If it has been determined at step 2606 that the tag ID is not registered, the analysis information management unit 205 executes the processing at step 2605. If it has been determined at step 2603 that the tag ID is registered, the analysis information management unit 205 executes the processing at step 2605.

Effects of the third embodiment will be described. The analysis device 101, analysis device 2310, and analysis device 2311 in the third embodiment receive information of a tag that has been made valid after successful biological authentication by the management server 2305 via the network 2304 and registers the tag information in the tag registration table. With this arrangement, even if a stolen tag or a forged tag has been brought to the inspection room, the analysis devices 101, 2310, and 2311 do not detect the tag unless appropriate fingerprint authentication information is input to the fingerprint authentication device 2309 of the management server 2305 to bring the authentication to a success. Thus, leakage of analytical performance information can be prevented.

Further, the information of the tag that has been made invalid after the successful biological authentication is received via the network 2304, and deleted from the tag registration table. With this arrangement, a complicated operation of invalidating the tag for each analysis device is eliminated.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A processing device for receiving a processing target and displaying processing performance information, comprising:
 a personal authentication information receiving unit for receiving personal authentication information;
 a security information DB; and
 a processing information managing unit for converting the personal authentication information received by the personal authentication information receiving unit to a user ID, detecting an event concerning a processing operation, associating the event with the user ID, thereby creating or updating an access management table for the processing performance information, for storage in the security information DB, and controlling access to the processing performance information based on the access management table,
 wherein the security information DB manages a user ID/group ID associated table for associating the user ID with a group ID of a group which the user belongs to; and
 the processing information managing unit refers to the user ID/group association table, thereby converting the user ID to the group ID, and controlling access to the processing performance information based on the group ID and the access management table.

2. The processing device according to claim 1, wherein
 the personal authentication information receiving unit is a tag detection unit for detecting a tag ID from a tag identifying a user, and the security information DB stores a tag registration table; and the processing information managing unit receives the tag ID from the tag detection unit and compares the tag registration table with the tag ID, thereby determining whether to receive the tag ID or not, and associates the tag ID with the user ID when determining receipt of the tag ID.

3. The processing device according to claim 1, wherein the event concerning the processing operation is a start of processing on the processing target.

4. The processing device according to claim 1, wherein the processing information managing unit receives the personal authentication information from the personal authentication information receiving unit at an arbitrary time interval;

the processing information managing unit stores the user ID associated with the personal authentication information in specific regions of role buffers each constituted from a plurality regions, based on an order of receipt; and the processing information managing unit controls access to the processing performance information based on the user ID stored in the role buffers and the access management table.

5. The processing device according to claim 4, wherein the processing information managing unit controls display of a management screen of the processing device based on the user ID stored in the role buffer and the access management table.

6. The processing device according to claim 4, wherein the processing information managing unit controls access to the processing performance information based on each location of the user ID in the role buffer and the access management table.

7. The processing device according to claim 4, wherein after the processing information managing unit has stored a tag ID in a role buffer at a time T, the personal authentication receiving unit receives authentication information at a time U, wherein U is greater than T; and the processing information managing unit receives the personal authentication information from the personal authentication information receiving unit, stores the user ID associated with the personal authentication information in a temporary buffer constituted from a plurality of regions, and determines whether to clear the role buffer or not, based on a result of comparison between the role buffer and the temporary buffer.

8. A processing device comprising:

a processing target receiving unit for receiving a processing target;

a display unit for displaying processing performance information;

a security information DB for storing a security information table with personal authentication information registered therein;

a personal authentication information receiving unit for receiving the personal authentication information at an arbitrary time interval; and a processing information managing unit for determining whether the personal authentication information received by the personal authentication information receiving unit is registered in the security information table or not and displaying a processing device management screen on the display unit based on a result of the determinations, wherein the security information DB manages a user ID/group ID association table for associating the user ID corresponding to the personal authentication information with a group ID of a group which the user belongs to; and the processing information managing unit refers to the user ID/group ID association table, thereby converting the user ID to the group ID, and controlling access to the processing performance information based on the group ID and the security information table.

9. The processing device according to claim 8, wherein the security information table further registers access permission information; and when the processing information managing unit displays the processing device management screen on the display unit based on the result of the determination, the processing information managing unit uses the security information table, thereby determining whether to output information indicating a result of processing onto the processing device management screen or not.

10. The processing device according to claim 9, wherein when the processing information managing unit has determined not to output the information indicating the result of the processing onto the processing device management screen, the processing information managing unit displays a blank or a specific character string.

11. A processing device comprising:

a processing target receiving unit for receiving a processing target;

a display unit for displaying processing performance information;

a security information DB for storing security information tables with personal authentication information and access permission information registered therein;

a personal authentication information receiving unit for receiving the personal authentication information at an arbitrary time interval; and a processing information managing unit for determining whether the personal authentication information received by the personal authentication information receiving unit is registered in the security information tables or not and displaying a processing device management screen onto the display unit based on a result of the determination; wherein the processing information managing unit manages a user ID/group ID association table for associating the user ID corresponding to the personal authentication information with a group ID of a group which the user belongs to an stores the user ID and the group ID in specific regions of role buffers each constituted from a plurality of regions, based on an order of receipt; and the processing information managing unit controls access to the processing performance information based on the user ID and group ID stored in the role buffers and the security information tables.

12. A processing device comprising:

a processing target receiving unit for receiving a processing target;

a display unit for displaying processing performance information;

a security information DB for storing a tag registration table;

a tag detection unit for detecting a tag ID from a tag for identifying an individual; and a processing information managing unit for receiving the tag ID from the tag detection unit and comparing the tag registration table with the tag ID, thereby determining whether to receive the tag ID or not; wherein the processing device comprises a plurality of processing devices and further comprises:

a management server for managing an authentication information/tag management information management table for associating personal authentication information with tag management information; or a communication unit for connecting the management server to at least one of the processing devices via a network;

the processing information managing unit manages a user ID/group ID association table for associating the user ID corresponding to the personal authentication information with a group ID of a group which the user belongs to and receives a request message including the tag management information from the management server via the network; and the processing information managing unit modifies the tag registration table based on the user ID, the group ID and the tag management information.

* * * * *